United States Patent [19]

Sato et al.

[11] Patent Number: 5,497,238

[45] Date of Patent: Mar. 5, 1996

[54] CONTROLLING ERASING OF TRACKS OF A RECORDING MEDIUM USED WITH A STILL VIDEO APPARATUS

[75] Inventors: Koichi Sato; Harumi Aoki, both of Tokyo, Japan

[73] Assignee: Asahi Kogaku Kogyo Kabushiki Kaisha, Tokyo, Japan

[21] Appl. No.: 439,443

[22] Filed: May 11, 1995

Related U.S. Application Data

[63] Continuation of Ser. No. 160,157, Dec. 2, 1993, abandoned.

[30] Foreign Application Priority Data

Dec. 3, 1992  [JP]  Japan ..................................... 4-350908
Dec. 3, 1992  [JP]  Japan ..................................... 4-350909

[51] Int. Cl.$^6$ ....................................................... H04N 5/76
[52] U.S. Cl. ............................. 358/310; 358/335; 360/66
[58] Field of Search .................................. 358/335, 310, 358/342, 906, 339; 360/66, 35.1, 33.1, 60; H04N 5/76

[56] References Cited

U.S. PATENT DOCUMENTS

| | | | |
|---|---|---|---|
| 4,849,832 | 7/1989 | Yamagata et al. | 360/66 |
| 5,038,217 | 8/1991 | Hayashi et al. | 358/341 |
| 5,043,831 | 8/1991 | Muramoto et al. | 360/66 |
| 5,212,556 | 5/1993 | Ogawa | 358/209 |
| 5,214,545 | 5/1993 | Maeda | 360/66 |
| 5,235,473 | 8/1993 | Sato et al. | 360/66 |
| 5,339,199 | 8/1994 | Ogawa | 360/35.1 |
| 5,359,465 | 10/1994 | Miyadera | 360/35.1 |
| 5,434,675 | 7/1995 | Sato et al. | 358/335 |

FOREIGN PATENT DOCUMENTS

| | | |
|---|---|---|
| 3235260 | 10/1991 | Japan . |
| 3235204 | 10/1991 | Japan . |

*Primary Examiner*—Tommy P. Chin
*Assistant Examiner*—Huy Nguyen
*Attorney, Agent, or Firm*—Greenblum & Bernstein

[57] ABSTRACT

A still video apparatus includes a recording and erasing system which includes a recording system for recording image signals corresponding to one picture composed of one or two fields on a plurality of tracks formed on a recording medium, and an erasing system for erasing the image signals recorded on the tracks of the recording medium. The recording and the erasing system includes an erasure discriminating function for erasing the image signals recorded on the tracks belonging to a predetermined track group selected from a plurality of tracks on which the image signals corresponding to one picture are recorded, when any track other than the tracks on which the image signals for constituting the picture are recorded is included in the predetermined track group; and for terminating the erasing of image signals recorded on the tracks belonging to the track group, when any track other than the tracks on which image signals for constituting the picture are recorded is not included in the predetermined track group. The recording and erasing system further includes a function for setting a predetermined track group selected from a plurality of tracks on which the image signals corresponding to the one picture are recorded, and for erasing all the image signals recorded on the predetermined track group at one erasing operation.

10 Claims, 10 Drawing Sheets

CONTROLLING ERASING OF TRACKS OF A RECORDING MEDIUM USED WITH A STILL VIDEO APPARATUS

This application is a continuation of application No. 08/160,157, filed Dec. 2, 1993, now abandoned.

BACKGROUND OF THE INVENTION

1. Field of the Invention

The present invention relates to a still video camera for recording and reproducing image signals.

2. Description of the Prior Art

Recently, various recording and reproducing apparatuses for recording and/or reproducing video images, audio signals or other information signals have been developed and widely used. In these recording and reproducing apparatuses, a still video camera is an apparatus for recording a photographed picture in a magnetic disk together with various information related thereto and further reproducing the recorded photographed picture as a still visual image at need.

In the still video camera, the image signals of a subject to be photographed are photoelectrically transferred to luminance signals and color difference signals through solid-state imaging elements. These electric signals are FM-modulated and synthesized into multiplex image signals, and the obtained image signals, are recorded on tracks formed on a magnetic disk being rotated. In addition, ID data signals related to the photographed image signals such as the type of recording (field recording or frame recording), the track number, the date of the photography, etc. are DPSK-modulated (Differential Phase Shift Keying modulation) and recorded on the same magnetic disk so as to be overlapped on the image signals in accordance with a frequency multiplex system.

When the image signals recorded on the magnetic disk are reproduced, the FM-modulated luminance signals and the color difference signals are both stored in memory sections as digital data in accordance with sampling pulses generated on the basis of vertical and horizontal synchronizing signals extracted by the luminance signals. The data stored in the memory sections are read out in accordance with a predetermined clock signal. The read data is converted into analog signals corresponding thereto, and the analog signals are outputted to a video output terminal through an output circuit.

In the still video apparatuses represented by the still video camera as described above, when a frame recording is implemented by a still video apparatus provided with a magnetic head and a memory section for storing image signals, two field images are stored in the memory section, and the data corresponding to these two stored field images are recorded on a single track, respectively. In other words, two field images are recorded on two tracks. On the other hand, when erased, the image signals for one picture (i.e., the image signals for the two fields) are erased simultaneously. In this case, since the tracks on which the image signals are to be recorded are manually selected and then erased with a single head, there is a problem in that the tracks on which the data corresponding to another picture is recorded (which is not required to be erased) are erroneously erased.

However, in the conventional recording method by which luminance signals and linearly-sequenced color difference signals are recorded on the same track under overlap conditions, since the frequency band of the luminance signals cannot be overlapped with the frequency band of the color difference signals, the frequency bands of both the recorded luminance and the color difference signals are limited to a narrow range, respectively. Therefore, it was impossible to obtain high definition picture, that is, the picture produced from image signals with a wide frequency band cannot be so far recorded.

In order to overcome this problem, an improved still video apparatus has been proposed by one of the inventors in U.S. patent application Ser. No. 07/913,191. According to the still video apparatus, a high definition picture can be recorded by dividing image signals corresponding to one picture into a plurality of groups and further by recording the respective image signals into a plurality of tracks with an expanded time axis so that the frequency band of the image signals to be recorded can be substantially widened.

In the above-mentioned still video apparatus, when the luminance signals and two color difference signals which constitute image signals obtained in the frame recording or in the field recording are recorded on a plurality of different tracks, respectively, a recording pattern is determined, for example as follows. Namely, the luminance signals corresponding to the first field are recorded from the outermost circumferential track to the second track on a magnetic disk. The luminance signals corresponding to the second field are recorded from the succeeding track to the fourth track, and the color difference signals corresponding to the respective luminance signals are recorded from the succeeding track to the eighth track. Accordingly, in this example, eight tracks in total are required for recording image signals which constitute a single picture.

Therefore, in the case where image signals for one picture are recorded on the eight tracks as described above, when the image signals for one recorded picture become unnecessary, all the image signals recorded on the plurality of the tracks (on which the image signals for the unnecessary picture are recorded) must be erased.

In the meantime, in the proposed apparatus, one-track erasing method is usually adopted in order to erase the signals recorded on the tracks. In this method, the tracks on which the signals to be erased are recorded are selected manually, and then the recorded signals are erased track by track. However, according to this erasing method, since an erasing operation must be made in each track, a number of erasing operations are required in order to erase the image signals for one picture which are recorded in a plurality of tracks. Therefore, it takes a relatively long time to erase the image signals recorded on the tracks, which results in the troublesome in the erasing operations. Further, in this case, the tracks on which the image signals to be erased are not necessarily arranged in sequence on the magnetic disk, so that there is a possibility that only the image signals recorded on a part of a plurality of tracks (on which image signals for one picture are recorded) are erased imperfectly. Further, there is another possibility that a part of a plurality of tracks (on which image signals for the necessary picture are recorded) are erased erroneously against operator's will.

Further, the magnetic disk for the still video apparatus of this kind can be used in common with the conventional still video apparatus of such a type that image signals for one field are recorded on one track as already explained. In the conventional still video apparatus of this type, when the image signals recorded on the tracks are required to be erased, the one-track erasing method (the recorded image signals are erased in each track) is also performed. Therefore, when the magnetic disk (on which image signals are recorded under the condition that they are divided into a plurality of tracks) is used for the conventional still video apparatus, there is a possibility in that when the image signals for one picture are required to be erased, image signals recorded on a part of a plurality of tracks on which other necessary pictures are recorded (other than the tracks on which the image signals to be erased are recorded) are erroneously erased.

As described above, when the image signals recorded on the magnetic disk from which a part of a plurality of tracks (on which the image signals for one picture are recorded) has been erroneously erased are reproduced, it is impossible to reproduce a correct picture on the basis of the signals recorded on the remaining tracks.

SUMMARY OF THE INVENTION

Accordingly, it is the primary object of the present invention to provide a still video apparatus using a magnetic disk on which image signals for one picture are recorded on a plurality of tracks, in which image signals recorded on a plurality of tracks and constituting normal or complete picture cannot be erased immediately.

Another object of the present invention is to provide a still video apparatus using a magnetic disk on which image signals for one picture are recorded on a plurality of tracks, in which all the image signals recorded on a plurality of predetermined tracks can be erased simultaneously.

To achieve the above-mentioned objects, the present invention provides a still video apparatus which comprises recording and erasing means including recording means for recording image signals corresponding to one picture composed of one or two fields on a plurality of tracks formed on a recording medium, and erasing means for erasing the image signals recorded on the tracks of the recording medium. The recording and erasing means comprises erasure discriminating means for enabling to erase the image signals recorded on a predetermined track group selected from a plurality of tracks on which the image signals corresponding to one picture are recorded, when any track other than the tracks on which the image signals for constituting the picture are recorded is included in the predetermined track group, and for disenabling to erase the image signals recorded on the tracks belonging to the predetermined track group, when any track other than the tracks on which image signals for constituting the picture are recorded is not included in the predetermined track group.

In the still video apparatus according to the present invention, since it is impossible to execute one-track erasure for a part of a plurality of tracks on which the image signals for a complete picture are recorded, it is possible to prevent the image signals for a complete picture from being erased erroneously. On the other hand, since it is possible to erase the unnecessary tracks on which the image signals for an abnormal or imperfect picture is recorded, it is possible to prevent the necessary tracks on which the image signals for a complete picture are recorded from being mixed with the unnecessary tracks on which the image signals for an abnormal or imperfect picture are recorded on the magnetic disk, thus improving the utilization efficiency of the recording space on the magnetic disk.

Further, the erasure discriminating means is preferably constituted so as not to be able to erase the image signals recorded on tracks other than the predetermined track group. Further, the image signals are preferably composed of luminance signals and color difference signals, and the luminance signals and the color difference signals are recorded separately on a plurality of tracks. Further, the predetermined track group can be constituted from a set of all the tracks on which the image signals for one picture are recorded, or a set of the tracks on which the image signals belonging to one field are recorded, or a set of the tracks on which the color difference signals are recorded. Further, the erasure discriminating means is constituted so as to be able to set two or more predetermined track groups, and further discriminate as to whether or not the image signals recorded on the tracks can be erased for each track group. Furthermore, preferably, each of the tracks in the predetermined track group includes an identification data recorded on each track together with the image signal to indicate that the track composes the predetermined track group, in which the discrimination is performed on the basis of the identification data when the image signals on the track is to be erased, Further, to achieve the other object, the present invention provides a still video apparatus, comprising recording and erasing means which includes recording means for recording image signals corresponding to one picture composed of one or two fields on a plurality of tracks formed on a recording medium, and erasing means for erasing the image signals recorded on the tracks of the recording medium. The recording and erasing means comprises means for setting a predetermined track group selected from a plurality of tracks on which the image signals corresponding to the one picture are recorded, and for erasing all the image signals recorded on the predetermined track group.

In the still video apparatus according to the present invention, all the image signals recorded on a plurality of tracks of the predetermined track group can be erased at one operation. As a result, it is also possible to prevent the image signals recorded on the tracks on which image signals for another picture are recorded from being erased, thus improving the erasure efficiency.

The image signals are preferably composed of luminance signals and color difference signals, and the luminance signals and the color difference signals are recorded separately on a plurality of tracks. Further, the predetermined track group can be constituted from a set of all the tracks on which the image signals for one picture are recorded, or a set of the tracks on which the image signals belonging to any one of the fields are recorded in frame recording, or a set of the tracks on which the color difference signals are recorded. Further, the image signals to be erased can be selected according to sorts of the image signals.

Other objects, features and advantages of the present invention will be apparent from the following description of the embodiments and the accompanying drawings.

DETAILED DESCRIPTION OF THE PREFERRED EMBODIMENTS

A preferred embodiment of the still video apparatus according to the present invention will be described hereinbelow in detail with reference to the attached drawings.

Figure 1:
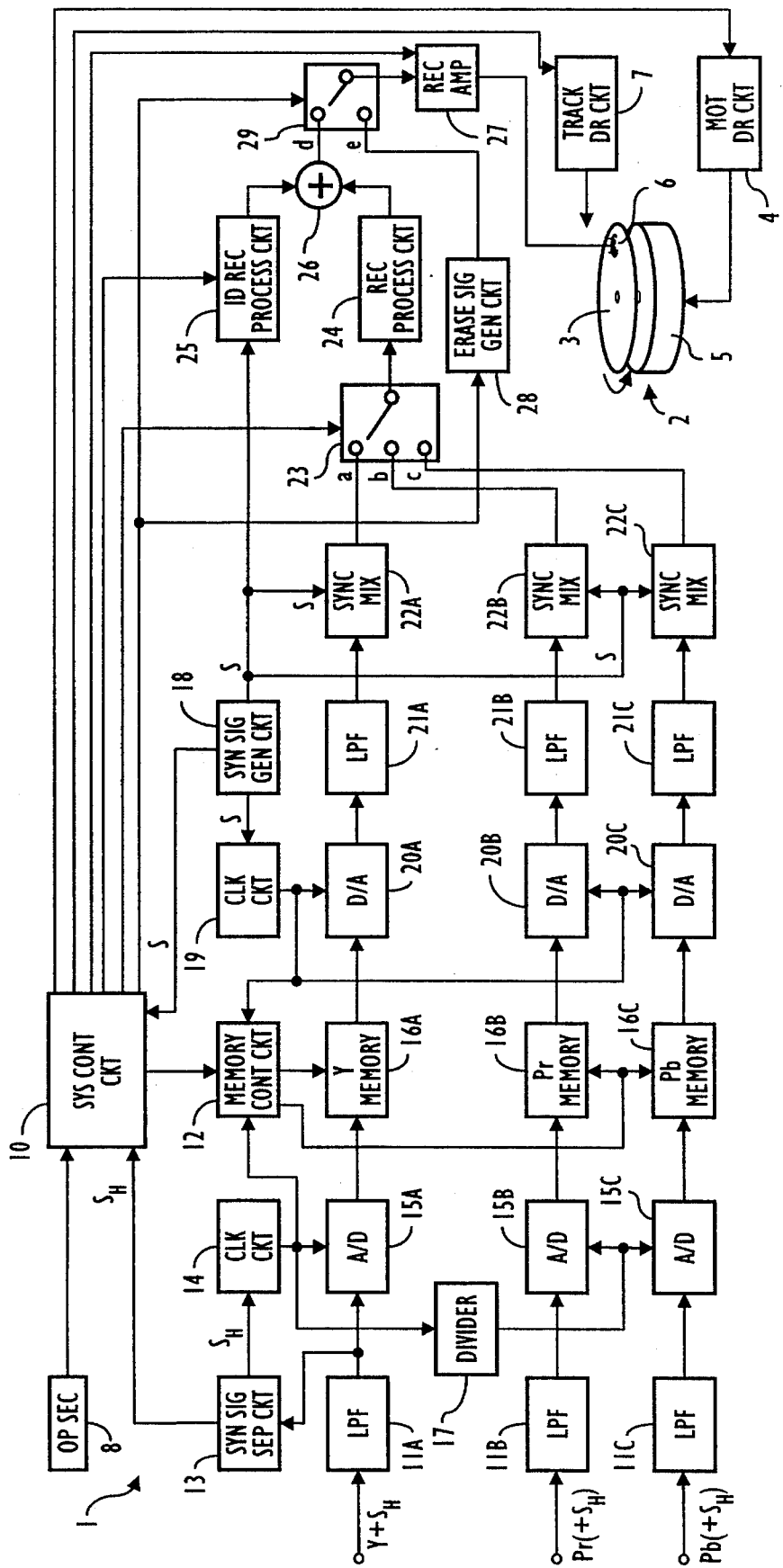
FIG. 1 is a block diagram showing an exemplary configuration of a recording system of the still video apparatus according to the present invention.

FIG. 1 is a block diagram showing an exemplary structure of the memory system of the still video apparatus according to the present invention. In FIG. 1, the still video apparatus is provided with a system control circuit 10 (i.e., a microcomputer) for controlling various functions of the apparatus.

Further, a magnetic disk drive mechanism 2 having a spindle motor 5 is provided for the apparatus 1. The rotation speed of the spindle motor 5 is controlled by a motor driver circuit 4 that supplies power to the spindle motor 5 and the system control circuit 10 for controlling the operation of the motor driver circuit 4.

In the magnetic disk drive mechanism 2, a magnetic disk 3 as a recording medium for recording various data such as image signals to be photographed, audio signals, data related to the image signals is removably installed under the condition being housed in a casing (not shown). The magnetic disk 3 is formed from a circular sheet material on the surface of which a magnetic layer is formed and a plurality (e.g., 52) of concentric circular tracks are formed and arranged on the magnetic layer. Further, the central position of the magnetic disk 3 is fitted to a rotary axle of the spindle motor 5. During both the recording and reproducing operation, the magnetic disk 3 is rotated at a constant speed (such as, for example 3600 rpm in an NTSC system and 3000 rpm in a PAL system) by the spindle motor 5.

Further, the spindle motor 5 outputs FG pulses of a predetermined number corresponding to the rotation speed of the spindle motor 5. Further, a PG pulse is outputted for each rotation of the magnetic disk 3 from near the central position of the magnetic disk 3 fitted to the rotary shaft of the spindle motor 5. On the basis of these pulses FG and PG, the system control circuit 10 controls the rotation speed of the spindle motor 5 so that the magnetic disk 3 can be rotated at a constant speed.

Further, the magnetic disk drive mechanism 2 is provided with a magnetic head 6. This magnetic head 6 is shifted continuously or intermittently in the radial direction of the magnetic disk 3 by a stepping motor (not shown). In the recording and reproducing operation, the stepping motor is driven to move the magnetic head 6 onto a predetermined track on the magnetic disk 3. Further, in the reproducing operation, the position of the magnetic head 6 is finely controlled so as to be located at a correct track position at which the maximum output can be obtained (referred to as auto-tracking).

The stroke, speed and timing of the movement of the magnetic head 6 are all controlled by a tracking drive circuit 7. The operation of this tracking drive circuit 7 is further controlled by the system control circuit 10.

An operation section 8 is connected to the system control circuit 10. In the operation section 8, there are arranged various switches (all not shown), for instance such as a selection switch for selecting one of the field recording and the frame recording, a head feed switch for moving the magnetic head 6 to a predetermined track on the magnetic disk 3, a REC switch for recording image signals on the magnetic disk 3, an erasure switch for erasing image signals recorded on the magnetic disk 3, a selection switch for selecting an erasing pattern (described later), a selection switch for selecting one of the normal picture and the high definition picture in relation to the recording processing systems thereof, etc. Further, in the case of the still video apparatus provided with both recording and reproducing systems, a selection switch (not shown) for selecting one of the recording operation and reproducing is provided on the operations section 8.

Further, a display unit (not shown) is connected to the system control circuit 10. In this display unit, there are displayed various information on a liquid crystal panel or light emitting elements, for instance such as the type of recording (field recording or frame recording), the mode of the recorded picture (normal picture or high definition picture), the track number, the presence or absence of track recording, photograph date, the presence or absence of a magnetic disk 3 loaded on the apparatus, the information related to a battery, the information related to emission by a strobe, the current time, an alarm (described later), etc. Further, in the case of the still video apparatus provided with both recording and reproducing systems, the operating mode (recording or reproducing) is also displayed.

In the case where the still video apparatus is a still video camera, an image forming section (not shown) is further provided. The image forming section is composed of a lens system, a diaphragm, a mirror, an optical filter, a shutter, solid-state imaging elements (charge coupled device (CCD), for instance), etc., so that an image of an object to be photographed can be focused on the CCD through the lens system, whenever the shutter is released. As to the CCD, any type for black-and-white image or for color image can be used. In this embodiment, however, color images will be described.

The CCD transfers the formed optical image photoelectrically into electric signals corresponding thereto to output chrominance signals (R, G and B), respectively. These chrominance signals are amplified by an amplifier (not shown), and further separated into a luminance signal (Y) and two color difference signals (R–Y, B–Y) by a process/matrix circuit (not shown). Further, horizontal and vertical synchronizing signals (SH) corresponding to high definition image signals are added to the luminance signal by a synchronizing signal generating circuit (not shown), and then outputted as another luminance signal (Y+SH). Further, in the case of high definition image signals, horizontal and vertical synchronizing signals (SH) are added to the two color difference signals (R–Y, B–Y), respectively. Further, in a case where the still video apparatus is not provided with the image forming section, these signals are inputted through an external input terminal.

As shown in FIG. 1, the luminance signal (Y+SH) is passed through a low-pass filter 11A by which the high frequency band (in which sampling noise is included) is cut off. The horizontal and vertical synchronizing signals (SH) are separated and extracted from the luminance signal (Y+SH) by a synchronous signal separating circuit 13. The separated signals are inputted to a clock generating circuit 14. The clock generating circuit 14 generates a memory write clock signal that is used as a write reference signal when image data is written in each memory, and the generated memory write clock signal is inputted to a memory control circuit 12 and an A/D converter 15A, respectively.

The luminance signal (Y) from which the horizontal and vertical synchronizing signals (SH) are separated is converted into digital signals by an A/D converter 15A, and stored in an Y memory 16A.

The color difference signal (R−Y) (referred to as color difference signal (Pr), hereinafter) is passed through a low-pass filter 11B, converted into digital signals by an A/D converter 15B, and stored in a Pr memory 16B. In the same way, the color difference signal (B−Y) (referred to as color difference signal (Pb), hereinafter) is passed through a low-pass filter 11C, converted into digital signals by an A/D converter 15C, and stored in a Pb memory 16C.

On the basis of the memory write clock signal applied by the clock generating circuit 14, the memory control circuit 12 controls, while keeping the write timing to the respective memories 16A to 16C, the following operation:

The A/D converter 15A is activated on the basis of the memory write clock signal applied by the clock producing circuit 14. Then, the memory control circuit 12 activates a write address counter provided in the control circuit 12, to write the digital data of the luminance signal (Y) at predetermined addresses of the Y memory 16A.

Further, the memory write clock signal applied by the clock generating circuit 14 is divided into ½ by a divider 17 to activate the A/D converters 15B and 15C, respectively. Further, the memory control circuit 12 activates another write address counter provided in the control circuit 12, to write digital data of the color difference signal (Pr) and the color difference signal (Pb) at predetermined addresses of the Pr memory 16B and Pb memory 16C, respectively.

Further, the synchronizing signal (SH) included in the input signal such as the luminance signal is not sampled and therefore not written in the memory.

From a synchronizing signal generating circuit 18, horizontal and vertical synchronizing signals (S) are generated in accordance with NTSC system, for instance, and then inputted to another clock generating circuit 19. This clock generating circuit 19 generates a memory read clock signal used as a read reference signal when image data are read from each memory, and the generated memory read clock signal is inputted to the memory control circuit 12 and D/A converter 20A, 20B and 20C, respectively.

On the basis of the memory write read signal applied by the clock generating circuit 19, the memory control circuit 12 controls, while keeping the read timing from the respective memories 16A to 16C, the following operation:

On the basis of the memory read clock signal applied by the clock generating circuit 19, the memory control circuit 12 activates another write address counter provided in the control circuit 12, to read the digital data of the luminance signal (Y) from predetermined addresses of the Y memory 16A. Further, the D/A converter 20A is activated to convert the digital signals of the read luminance signal (Y) into analog signals.

Further, on the basis of the memory read clock signal applied by the clock generating circuit 19, the memory control circuit 12 activates another write address counter provided in the control circuit 12, to read the digital data of the color difference signals (Pr) and (Pb) from predetermined addresses of the Pr memory 16B and the Pb memory 16C, respectively. Further, the D/A converters 20B and 20C are activated to convert the digital signals of the read color difference signals (Pr) and (Pb) into analog signals.

Further, in the memory control circuit 12, the memory write control and the memory read control are switched from each other on the basis of a mode switching command signal applied by the system control circuit 10.

Further, the horizontal and vertical synchronizing signals (SH) supplied by the synchronizing signal separating circuit 13 and the horizontal and vertical synchronizing signals (S) supplied by the synchronizing signal generating circuit 18 are all inputted to the system control circuit 10, respectively. The synchronizing signals are used as control signals for controlling the rotational phase of the spindle motor 5, for instance and as timing signals for controlling the timings of various operation.

In the case of the recording of high definition image signals, the memory read clock signal applied by the clock generating circuit 19 has a lower frequency, for instance ¼ times lower than that of the memory write clock signal applied by the clock generating circuit 14. Therefore, the frequency of the read clock signal of the luminance signal is ¼ of that of the write clock signal, and the frequency of the read clock signal of both color difference signals is ½ of that of the write clock signal. Accordingly, the image data are recorded on the extended time axis, as compared with the signals inputted to the input system.

The analog luminance signal (Y) and the analog color difference signals (Pr) and (Pb) are passed through the low-pass filters 21A, 21B and 21C, respectively, in which the respective high frequency band thereof is cut off. Further, the vertical and horizontal synchronizing signals (S) supplied by the synchronizing signal generating circuit 18 are mixed with these analog signals (Y), (Pr) and (Pb), respectively by synchronizing signal mixing circuits 22A, 22B and 22C.

These synchronizing signal mixing circuits 22A, 22B and 22C are connected to three terminals a, b, and c of a change-over switch 23, respectively. The three terminals of the change-over switch 23 are switched on the basis of a switch signal applied by the system control circuit 10 so that the luminance signal (Y+S) and the color difference signals (Pr+S) and (Pb+S) can be outputted in sequence to a recording processing circuit 24, respectively. The recording processing circuit 24 modulates these inputted signals into FM signals, respectively.

Further, the system control circuit 10 outputs various ID data signals related to the image information such as the type of the recording (filed recording or frame recording), the field number in the case of the field recording, the mode of the recorded picture (normal recording or high definition recording), the sort of the recorded image signals; that is, the luminance signal (Y+S), color difference signal (Pr+S), and color difference signal (Pb+ S), the composing portions of one picture (in the case of four divisions, for instance, upper left, upper right, lower left and lower right), the track number, the photograph date, etc. The ID recording processing circuit 25 modulates the carrier (produced on the basis of the horizontal synchronizing signal (S) supplied by the synchronizing signal generating circuit 18) on the basis of the ID data signals so as to output DPSK (Differential Phase Shift Keying) signals. Further, the ID data will be described in more detail later.

The DPSK signals related to the ID data are synthesized together with the image signals FM-modulated by the recording processing circuit 24 by an adder 26. The adder 26 is connected to a terminal d of a change-over switch 29 for selecting the recording operation and the erasing operation. That is, in the recording operation, terminal d is connected in the change-over switch. In the erasing operation, terminal e is connected in the change-over switch. Terminals d and e are switched by a switching signal applied by the system control circuit 10.

When terminal d is connected in the change-over switch 29, the image signals synthesized by the adder 26 are amplified by a recording amplifier 27 under the control of the system control circuit 10, and further recorded on predetermined tracks of the rotating magnetic disk 3 through the magnetic head 6.

Figure 3:
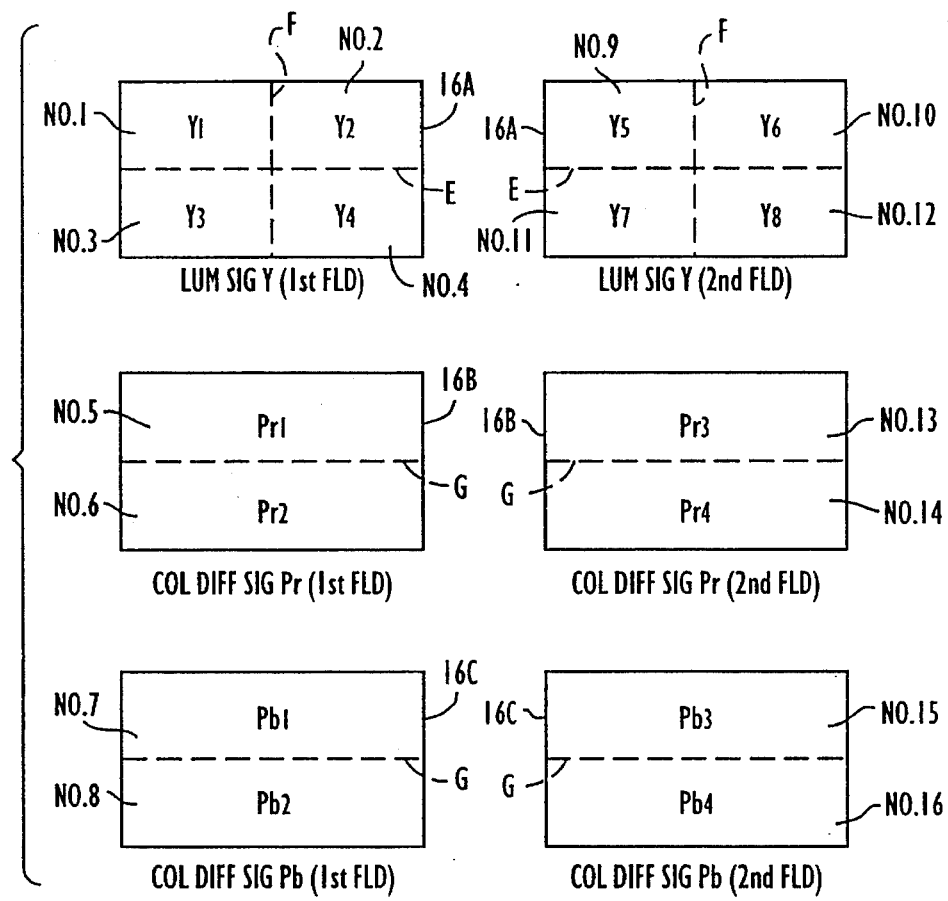
FIG. 3 is a model view showing an example of patterns of image signal storing regions in each memory.

In the case of the high definition image recording, since the image signals for one picture are recorded with having been divided into a plurality of tracks on the expanded time axis, the data stored in the respective memories 16A to 16C are divided as follows:

FIG. 3 is a model view of a high definition image recording mode showing an exemplary pattern of image signal memory regions in the memories 16A to 16C, in which the image signals are recorded in the frame recording mode, and the luminance signal (Y) and the color difference signals (Pr) and (Pb) are recorded on a plurality of tracks. In more detail, one picture is composed of a first field and a second field; the luminance signal (Y) is divided into four in one field; the color difference signals (Pr) and (Pb) are divided into two in one field, respectively; and all the divided signals are stored in the corresponding memories 16A to 16C, respectively. Further, FIG. 3 shows the arrangement of the memory regions for image signals in a memory, which also correspond to the image (still picture) displayed on the display unit.

The luminance signals (Y) are divided into four divisions by two central lines E and F extending in the horizontal and vertical directions, respectively in the picture. In the first field, the luminance signal Y1 corresponding to the upper left portion is stored in the first region of the Y memory 16A; the luminance signal Y2 corresponding to the upper right portion is stored in the second region thereof; the luminance signal Y3 corresponding to the lower left portion is stored in the third region thereof; and the luminance signal Y4 corresponding to the lower right portion is stored in the fourth region thereof, respectively.

The color difference signal (Pr) is divided into two divisions by a central line G extending in the horizontal direction in the picture. In the first field, the color difference signal Pr1 corresponding to the upper half is stored in the fifth region of the Pr memory 16B, and the color difference signal Pr2 corresponding to the lower half is stored in the sixth region thereof, respectively.

The color difference signal (Pb) is divided into two divisions by a central line G extending in the horizontal direction in the picture. In the first field, the color difference signal Pb1 corresponding to the upper half is stored in the seventh region of the Pb memory 16C, and the color difference signal Pb2 corresponding to the lower half is stored in the eighth region thereof, respectively.

In the second field, in the same manner as the first field as described above, the luminance signals Y5, Y6, Y7 and Y8 corresponding to the upper left, upper right, lower left and lower right in the picture are stored in the ninth region, the tenth region, the eleventh region and twelfth region of the Y memory 16A, respectively. Further, the color difference signals Pr3 and Pr4 corresponding to the upper half portion and the lower half portion in the picture are stored in the thirteenth region and the fourteenth region of the Pr memory 16B, respectively. Further, the color difference signals Pb3 and Pb4 corresponding to the upper half portion and the lower half portion in the picture are stored in the fifteenth region and the sixteenth region of the Pb memory 16C, respectively.

Here, the picture composing Nos. 1 to 16 are assigned to the respective picture portions divided by the respective signals in one picture (referred to as composing pictures, hereinafter). In this case, the composing picture Nos. 1 to 16 correspond to the luminance signals Y1, Y2, Y3 and Y4, the color difference signals Pr1 and Pr2, the color difference signals Pb1 and Pb2, the luminance signals Y5, Y6, Y7 and Y8, the color difference signals Pr3 and Pr4 and the color difference signals Pb3 and Pb4, respectively.

Figure 4:
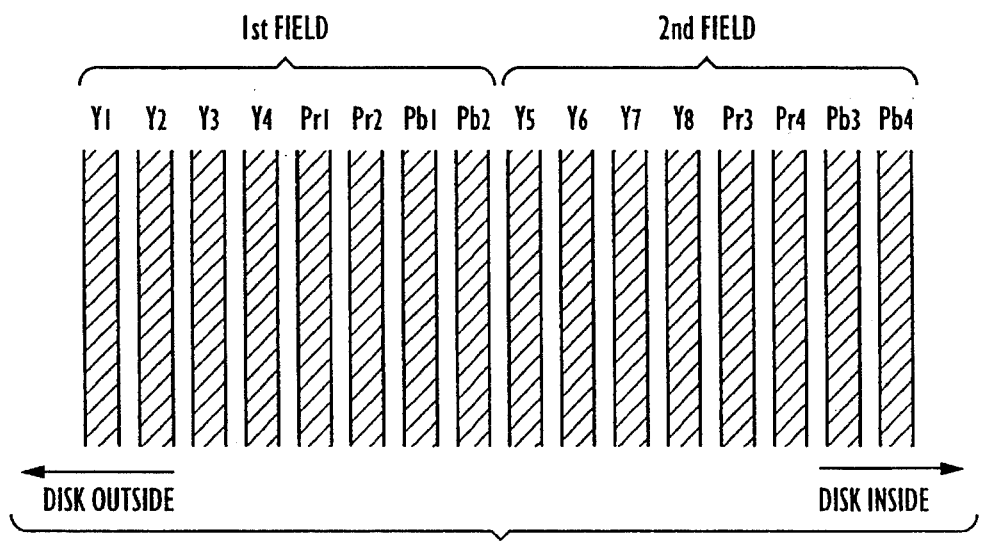
FIG. 4 is an illustration showing an example of track patterns formed on a magnetic disk.

FIG. 4 shows an example of a track pattern formed on the magnetic disk 3. As shown, the respective image signals are recorded on 16 tracks continuously arranged in the radial direction of the magnetic disk 3. In this case, the image signals belonging to the first field are recorded on the 8 tracks arranged continuously, and the image signals belonging to the second field are recorded on the other 8 tracks arranged continuously. In the example shown in FIG. 4, these image signals are continuously recorded from the outer circumferential side to the inner circumferential side of the magnetic disk 3 in the order of the first field luminance signals Y1, Y2, Y3 and Y4, the color difference signals Pr1 and Pr2, the color difference signal Pb1 and Pb2, the second field luminance signals Y5, Y6, Y7 and Y8, the color difference signals Pr3 and Pr4 and the color difference signal Pb3 and Pb4, in sequence.

Figure 5:
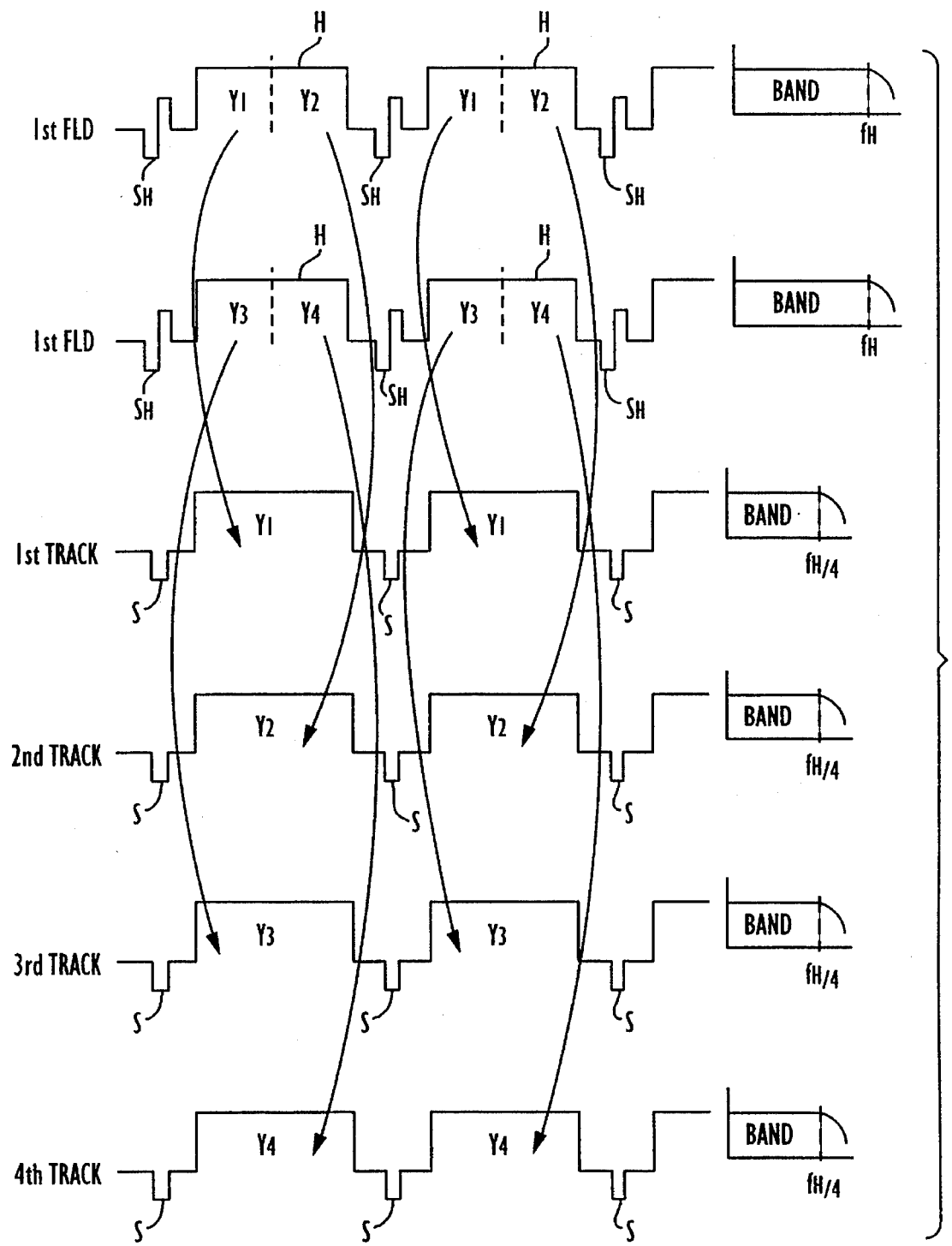
FIG. 5 is a timing chart showing the relationship between luminance signals (Y) to be inputted to the recording system of the still video apparatus and luminance signals (Y) to be recorded on tracks of the magnetic disk.

FIG. 5 is a timing chart showing the relationship between the luminance signals (Y) inputted to the recording system of the still video apparatus and the luminance signals (Y) recorded on the track in the recording operation of the high definition picture. Although one picture is composed of the first field and the second field, only the first field luminance signals are shown in FIG. 5. The first field luminance signals are composed of a great number of horizontal scanning lines H, and the luminance signal corresponding to one horizontal scanning line exists between two adjacent horizontal synchronizing signals SH (referred to as horizontal synchronizing period, hereinafter).

When the luminance signals are recorded, terminal a of the change-over switch 23 is connected to the recording processing circuit 24, and the magnetic head 6 moves from the first track to the fourth track of the magnetic disk 3 in sequence. In more detail, when the luminance signal Y1 is recorded, the magnetic head 6 is moved onto the first track; when the luminance signal Y2 is recorded, the magnetic head 6 is moved onto the second track; when the luminance signal Y3 is recorded, the magnetic head 6 is moved onto the third track; and when the luminance signal Y4 is recorded, the magnetic head 6 is moved onto the fourth track, as shown in FIG. 4. Further, the N-th track implies any relative track numbers, without designating the N-th track from the outermost circumference of the magnetic disk 3.

As shown in FIG. 5, when the frequency band of the luminance signals Y1 to Y4 written in the Y memory 16A is denoted by fH, since the time axis is expanded by 4 times when the luminance signals are read from the same memory 16A, the frequency band of the luminance signals Y1 to Y4 recorded on the first to fourth tracks is fH/4. Although there is a limit of the frequency band to be recorded due to the characteristics of the magnetic disk 3, in the case of the above-mentioned construction, it is possible to substantially record the luminance signals within the frequency band higher than the characteristics of the magnetic disk 3, thereby realizing the high definition picture recording.

Figure 6:
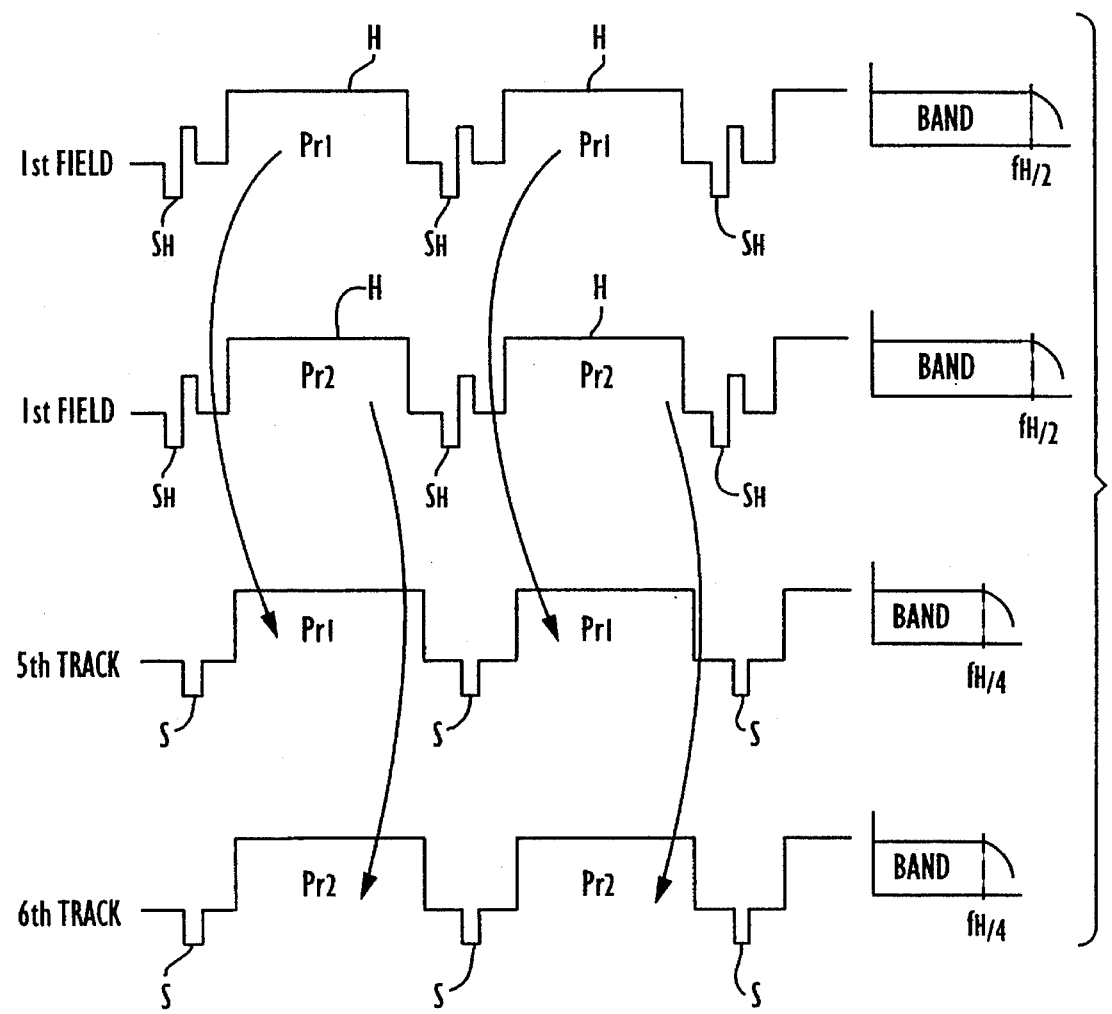
FIG. 6 is a timing chart showing the relationship between color difference signals (Pr) to be inputted to the recording system of the still video apparatus and color difference signals (Pr) to be recorded on the tracks of the magnetic disk.

FIG. 6 is a timing chart showing the relationship between the color difference signals (Pr) inputted to the recording system of the still video apparatus and the color difference signals (Pr) recorded on the track in the recording operation of the high definition picture. Although one picture is composed of the first field and the second field, only the first field color difference signals are shown in FIG. 6. The first field color difference signals are composed of a great number of horizontal scanning lines H, and the color difference signal corresponding to one horizontal scanning line exists within one horizontal synchronizing period.

When the color difference signals (Pr) are recorded, terminal b of the change-over switch 23 is connected to the recording processing circuit 24, and the magnetic head 6 moves from the fifth track to the sixth track of the magnetic disk 3 in sequence. In accordance with the movement of the magnetic head 6, the color difference signal Pr1 is recorded on the fifth track and the color difference signal Pr2 is recorded on the sixth track, as shown in FIG. 4.

As shown in FIG. 6, since the frequency band of the color difference signals Pr1 and Pr2 is fH/2 when recorded in the Pr memory 16B and the time axis is expanded by 2 times when the color difference signals are read from the same memory 16B, the frequency band of the color difference signals Pr1 and Pr2 recorded on the fifth to sixth tracks is fH/4. Although there is a limit of frequency band to be recorded due to the characteristics of the magnetic disk 3, in the case of the above-mentioned construction, it is possible to substantially record the color difference signals within the frequency band higher than the characteristics of the magnetic disk 3, thereby realizing the high definition picture recording.

When the color difference signals (Pb) are recorded, terminal c of the change-over switch 23 is connected to the recording processing circuit 24, and the magnetic head 6 is moved to the seventh and the eighth track. Although not shown, in the same way as with the case of the color difference signals (Pr), the color difference signal Pb1 is recorded on the seventh track with a band of fH/4, and the color difference signal Pb2 is recorded on the eighth track with a band of fH/4, respectively.

In the case of the second field, the luminance signals Y5 to Y8 and the color difference signals Pr3, Pr4, Pb3 and Pb4 are all recorded on the (N+8)th tracks (N=1 to 8), in the same way as with the case of the first field, as shown in FIG. 4.

Further, the synchronizing signals recorded on the magnetic disk 3 are not the synchronizing signals (SH) for the high definition picture, but are replaced with other synchronizing signals (S) in accordance with the NTSC system, for instance.

Figure 7:
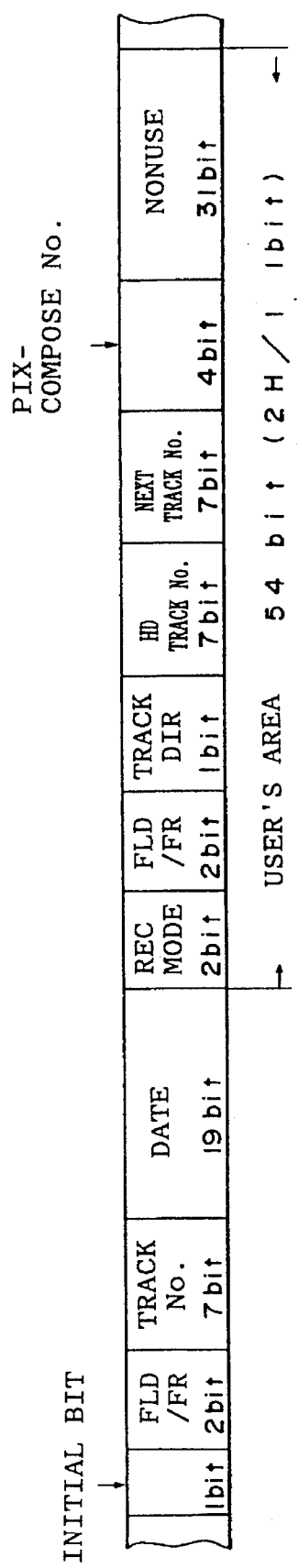
FIG. 7 is an illustration showing an example of the bit allocation of ID codes.

FIG. 7 shows a bit allocation of the ID codes. In FIG. 7, one bit data is recorded within a time period twice longer than the one horizontal scanning period (one horizontal synchronizing period). The ID code construction is the same as that used for the ordinary still video apparatus, and a user's area is also provided for the ID codes. In this embodiment, with the use of this user's area, it is possible to record any necessary information for automatically processing recording, erasing, reproducing, etc.

In the user's area, there are allocated 2 bits indicative of the recording mode; 2 bits indicative of the difference among the field recording, the first field recording in the frame recording, and the second field in the frame recording; 1 bit indicative of the tracking direction; 7 bits indicative of the head track number; 7 bits indicative of the succeeding track number; and 4 bits indicative of composing pictures in one picture. The remaining 31 bits are used for recording other information or not used. These bit allocation will be described in further detail with reference to the following tables.

Table 1 lists the bit pattern related to the recording mode.

TABLE 1

| RECORDING MODES (2 BITS) | | |
|---|---|---|
| | B | A |
| STD SIG STD REC (NOR REC) MODE | 0 | 0 |
| STD SIG HI-DEF (TRACK REC ON COL DIFF SIG) MODE | 0 | 1 |
| HI-DEF SIG REC (IMAGE DIV REC) MODE | 1 | 0 |
| STD SIG TRACK SEP FR REC MODE | 1 | 1 |

In the standard signal standard recording (normal recording), the standard image signals, for instance such as the image signals corresponding to the NTSC system, are recorded as they are, without time axis expansion or picture division. In this standard signal standard recording mode, the two bits are set to [0 0].

In the standard signal high definition recording (track recording on the basis of color difference signals) mode, the luminance signals and the color difference signals of the standard image signals are recorded on different tracks, respectively. In this standard high definition signal recording mode, the two bits are set to [0 1].

In the high definition signal recording (image division recording) mode, the high definition image signals corresponding to HDTV system are divided into plural pictures in one picture; the high definition image signals for each divided picture are transferred into the standard image signals on the extended time axis; and then recorded on a plurality of tracks. In this mode, the frequency bands of the image signals are extended substantially by virtue of the time axis extension. In this high definition signal recording mode, the two bits are set to [1 0]. Further, the recording mode of this embodiment as shown in FIG. 4, is this high definition signal recording mode.

In the standard signal track separation frame recording mode, the frame recording is effected as it is, without time axis extension or picture division. Further, the tracks on which the first field image signals are recorded and the tracks on which the second field image signals are recorded are separated from each other. In this standard signal track separation frame recording mode, the two bits are set to [1 1].

Table 2 lists the bit pattern relating to the classification of the field recording and the frame recording, and the classification of the first field and the second field in the frame recording.

TABLE 2

FIELD/FRAME(2) (2 BITS)

|  | B | A |
|---|---|---|
| FIELD REC | 0 | 0 |
| 1st FIELD IN FRAME REC | 0 | 1 |
| 2nd FIELD IN FRAME REC | 1 | 0 |

In the field recording, the two bits are set to [0 0]. In the first field of the frame recording, the two bits are set to [0 1]. In the second field of the frame recording, the two bits are set to [1 1].

TABLE 3

TRACKING DIRECTION (1 BIT)

|  | A |
|---|---|
| OUTER CIRC → INNER CIRC | 0 |
| INNER CIRC → OUTER CIRC | 1 |

In the case where the magnetic head 6 is moved from the outer circumferential side to the inner circumferential side of the magnetic disk 3, the one bit is set to [0] see Table 3. In the case where the magnetic head 6 is moved from the inner circumferential side to the outer circumferential side of the magnetic disk 3, the one bit is set to [1].

In FIG. 7, the head track number in the user's area implies an absolute head track number of the tracks on which the image signals of the first composing picture are recorded. The bit pattern related to this head track number is the same as the bit pattern of the track numbers of the format.

Further, the succeeding track number implies an absolute track number of the tracks on which the image signals of the succeeding composing picture (next to the current composing picture of one picture) are recorded. The bit pattern related to the succeeding track number is the same as the bit pattern of the track numbers of the format.

Table 4 lists the bit pattern related to the respective composing pictures for constituting one picture.

TABLE 4

NOs. OF COMPOSING PIX OF ONE PIX (4 BIT)

| NO. OF COMPOSE PIX | MSB D | C | B | LSB A |
|---|---|---|---|---|
| NO. 1 | 0 | 0 | 0 | 1 |
| NO. 2 | 0 | 0 | 1 | 0 |
| NO. 3 | 0 | 0 | 1 | 1 |
| NO. 4 | 0 | 1 | 0 | 0 |
| NO. 5 | 0 | 1 | 0 | 1 |
| NO. 6 | 0 | 1 | 1 | 0 |
| NO. 7 | 0 | 1 | 1 | 1 |
| NO. 8 | 1 | 0 | 0 | 0 |
| NO. 9 | 1 | 0 | 1 | 0 |
| NO. 10 | 1 | 0 | 1 | 0 |
| NO. 11 | 1 | 0 | 1 | 1 |
| NO. 12 | 1 | 1 | 0 | 0 |
| NO. 13 | 1 | 1 | 0 | 1 |
| NO. 14 | 1 | 1 | 1 | 0 |
| NO. 15 | 1 | 1 | 1 | 1 |
| NO. 16 | 0 | 0 | 0 | 0 |

The above-mentioned information of the composing picture numbers indicates the region of the divided picture to which the image signals of the ID track (on which the ID data are recorded) belong, and in addition the difference among the luminance signal (Y) and the color difference signals (Pr) and (Pb).

As shown in FIG. 3, in this embodiment for instance, the respective composing pictures which constitute one picture are denoted by the composing picture numbers form No. 1 to No. 16. These numbers from No. 1 to No. 16 can be represented by setting the 4 bits as [0 0 0 1], [0 0 1 0], [0 0 1 1], [0 1 0 0], [0 1 0 1], [0 1 1 0], [0 1 1 1], [1 0 0 0], [1 0 0 1], [1 0 1 0], [1 0 1 1], [1 1 0 0], [1 1 0 1], [1 1 1 0], [1 1 1 1], and [0 0 0 0], respectively.

The recording and erasing operation of the first embodiment of the present invention will be described in detail hereinbelow with reference to FIG. 1, again.

As shown in FIG. 1, the still video apparatus 1 includes an erasure signal generating circuit 28, which is connected to terminal e of the change-over switch 29. To erase one track, for instance under control of the system control circuit 10, when an erasure switch of the operation section 8 is operated, terminal e of the change-over switch 29 is connected to the recording amplifier 27; the erasure signal generating circuit 28 is activated to output an erasure signal; and the erasure signal is amplified by the recording amplifier 27 to erase the image signals recorded on a predetermined track on the rotating magnetic disk 3 through the magnetic head 6.

In this still video apparatus 1, the erasure operation is controlled as follows: a predetermined one-unit track group classified according to the sorts of the image signals is determined from among a plurality of tracks on which the image signals corresponding to one picture are recorded. Further, when an incomplete track other than the tracks (on which the image signals for constituting the picture are recorded) is included in the predetermined track group, the tracks required to be erased or the image signals recorded on the respective tracks of the predetermined track group are enabled to be erased by the one-track erasure operation. The incomplete track implies such a track that image signals are already erased; no image signals are recorded; image signals which constitute another picture are record; image signals which do not constitute the picture are recorded; image signals which cannot be reproduced or are disordered for some reason or other are included; etc. Further, when the incomplete tracks other than the tracks (on which the image signals for constituting the picture are recorded) are not included in the predetermined track group, the tracks required to be erased or the image signals recorded on the respective tracks of the predetermined track group are disabled from being erased in the one-track erasure operation.

Here, the above-mentioned predetermined track group (referred to as set-up track group) includes all of and a part (selected by the user) of the tracks on which the image signals corresponding to one picture are recorded.

Therefore, according to the present invention, when the image signals recorded on a part (at least one track) of the plural tracks (on which the image signals corresponding to one picture are recorded) are erased, the unnecessary tracks can be erased by one-track erasing operation in accordance with the selection of the predetermined track group pattern, in order to record more pictures on a constant limited recording space on the magnetic disk 3. Further, it is possible to prevent erroneous erasure for necessary tracks from being performed during the erasing operation.

As the patterns of the predetermined track groups, the following patterns (1) to (5) can be given, in addition to a set of all the tracks on which the image signals corresponding to one picture are recorded:

(1) In the case of the frame recording or in the case where the field recording and the frame recording are mixed with each other, a set of tracks on which the image signals corresponding to one field is determined as the set-up track group. This pattern is selected when the image signals are required to be recorded without requiring high picture quality, for instance.

(2) In the case where the luminance signals and the color difference signals are recorded on tracks different from each other, a set of tracks on which the color difference signals are recorded is determined as the set-up track group. This pattern is selected when the image signals are required to be kept recorded as a white-and-black picture, for instance.

(3) In the case where the luminance signals and the color difference signals are recorded on tracks different from each other, a set of tracks on which the luminance signals are recorded is determined as the set-up track group.

(4) In the case of the frame recording or in the case where the field recording and the frame recording are mixed with each other and further the luminance signals and the color difference signals are recorded on tracks different from each other, a set of tracks on which the color difference signals belonging to one field are recorded is determined as the set-up track group.

This pattern is selected when the image signals are required to be kept recorded as the field picture and the white-and-black picture, without requiring high picture quality, for instance.

(5) In the case of the frame recording or in the case where the field recording and the frame recording are mixed with each other and further the luminance signals and the color difference signals are recorded on tracks different from each other, a set of tracks on which the luminance signals belonging to one field are recorded is determined as the set-up track group.

Figure 8:
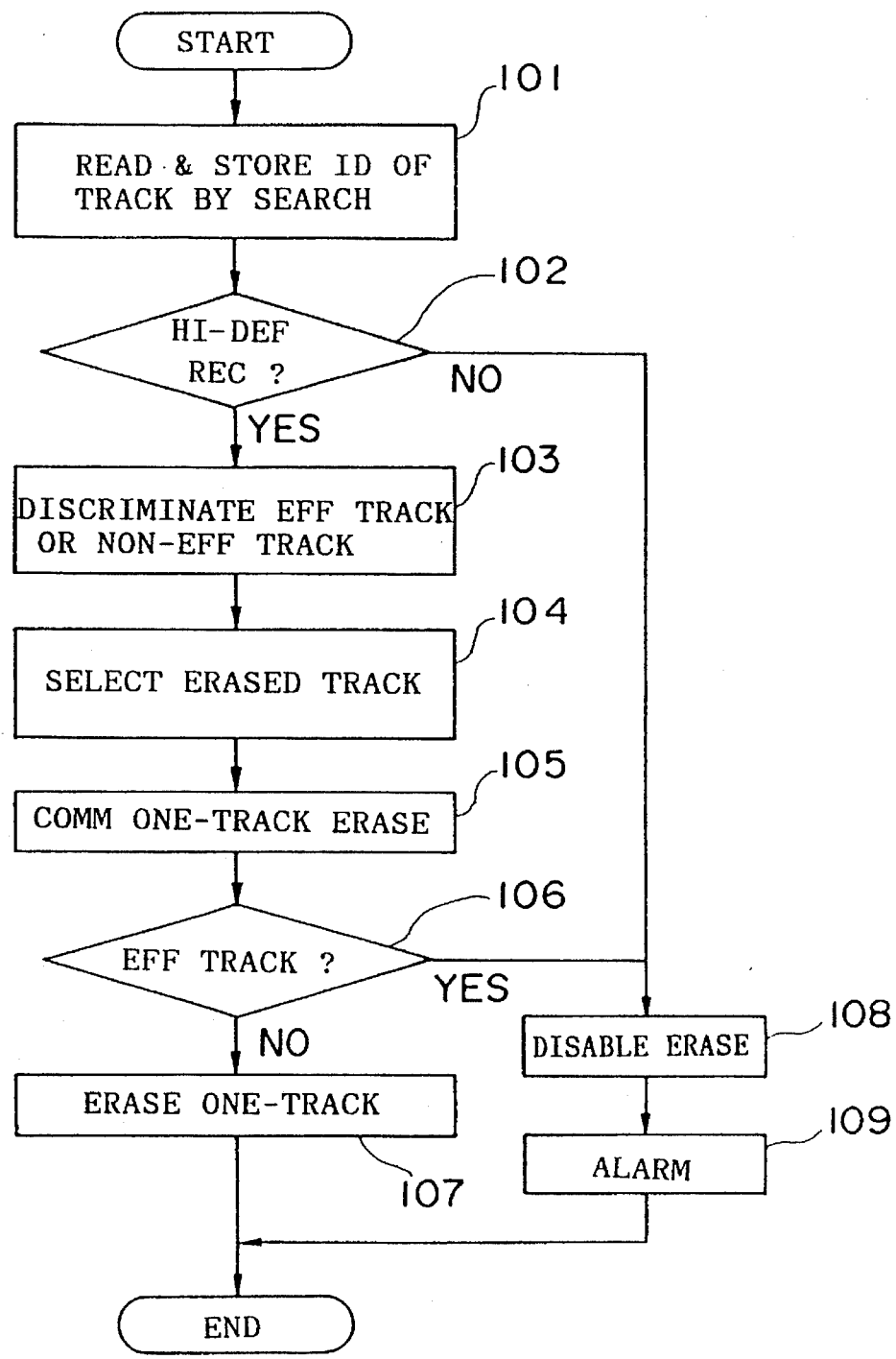
FIG. 8 is a flowchart for an erasure sequence of image signals in a first embodiment of the present invention.

FIG. 8 is a flowchart showing the image signal erasure sequence. The erasing operation of the still video apparatus according to the present invention will be described hereinbelow with reference to this flowchart.

When the image signals are erased track by track, any given pattern is selected from the above-described respective patterns as the set-up track group. Further, all the tracks of the magnetic disk 3 are pre-searched to decode the ID data recorded on the respective tracks, and the decoded ID data are stored in the system control circuit 10 (in step 101).

Successively, on the basis of the respective ID data, the system control circuit 10 (referred to as control, hereinafter) discriminates whether or not the recording mode of the respective tracks is the high definition recording mode (in step 102).

When the recording mode is discriminated as the high definition recording mode in step 102; that is, when the recording mode, as listed in Table 1, is the standard signal high definition recording mode or the high definition signal recording mode, control discriminates whether the respective tracks recorded in this recording mode are effective tracks or non-effective tracks on the basis of the respective ID data (in step 103).

In this step, this discrimination is made for each set-up track group. When there is some incompletion in the set-up track group (that is, when the set-up group includes an erased track, a non-recorded track, a track on which image signals for constituting another picture are recorded, a track on which image signals not related to the constitution of the picture are recorded, a track on which disordered image signals (or cannot be reproduced) for some reason or other are recorded, etc.) the respective tracks of the set-up track group are determined to be [ineffective tracks]. Further, when there is no incompletion in the set-up track group (that is, when no erased-tracks are included, for instance), the respective tracks of the set-up track group are determined to be [effective tracks].

Successively, control selects one track to be erased (in step 104). Namely, in step 104, the magnetic head 6 is driven to a position of the track to be erased by the control of the control circuit 10. Thereafter, the control circuit 10 outputs a one-track erasure command (in step 105) after it is detected that an erasing switch of the operation section 8 has been operated.

Thereafter, control discriminates whether or not the selected track is effective (in step 106).

In step 106, if the selected track is discriminated as being non-effective (that is, as being an ineffective track) control executes the one-track erasure (in step 107).

When the recording mode is discriminated as not being the high definition signal recording mode, that is, when the recording mode, as listed in Table 1, is discriminated as the standard signal standard recording mode or the standard signal track separation frame recording mode in step 102 and further the selected track is an effective track (in step 106), control disables the one-track erasure (in step 108) from being executed, and generates an alarm indicative of the erasure inhibition (in step 109). As the alarming method, the alarm is displayed on the display unit; a buzzer is sounded; or an alarm lamp is lit up, etc. Further, this erasure inhibition can be released manually by operating the operation section 8, for instance.

Further, when the magnetic disk 3 is cleaned, the abovementioned steps from 104 to 109 are all executed to all the tracks. In this process, it is possible to construct the system control circuit 10 in such a way that the tracks to be erased can be selected beginning from the outermost circumferential side to the innermost circumferential side of the magnetic disk 3 or vice versa, in sequence manually or automatically both in accordance with the operation of the operating section 8.

Further, when no information as shown in FIG. 7 is recorded in the user's area as the ID data, the corresponding tracks are all usable as the effective tracks.

In the case where a set of all the tracks on which image signals for one picture are recorded is selected as the set-up track group, all the signals recorded on 16 tracks continuously arranged in the radial direction of the magnetic disk 3 are erased with respect to the picture recorded on the incomplete track, by executing the program as shown in FIG. 8. All the signals are the luminance signals Y1 to Y4, the color difference signals Pr1, Pr2, Pb1 and Pb2, the luminance signals Y5 to Y8, and the color difference signals Pr3, Pr4, Pb3 and Pb4, in the case of the track pattern shown in FIG. 4.

In the case where a set of the tracks on which image signals belonging to one field are recorded is selected as the set-up track group, only the luminance signals Y1 to Y4 and the color difference signals Pr1, Pr2, Pb1 and Pb2 are erased, but the luminance signals Y5 to Y8 and the color difference signals Pr3, Pr4, Pb3 and Pb4 are not erased with respect to the picture recorded on an incomplete track only in the first field, in the track pattern, as shown in FIG. 4.

Further, in the case where a set of the tracks on which image signals belonging to one field are recorded is selected as the set-up track group, only the luminance signals Y5 to Y8 and the color difference signals Pr3, Pr4, Pb3 and Pb4 are erased, but the luminance signals Y1 to Y4 and the color difference signals Pr1, Pr2, Pb1 and Pb2 are not erased with respect to the picture recorded on an incomplete track only in the second field, in the track pattern, as shown in FIG. 4.

Further, in this embodiment, the respective tracks not selected as the set-up track group are disabled from being erased, as occasion demands.

For instance, in the case where a set of the tracks on which the color difference signals are recorded is selected as the set-up track group, only the color difference signals Pr1, Pr2, Pb1 and Pb2 and the color difference signals Pr3, Pr4, Pb3 and Pb4 are erased with respect to the picture recorded on an incomplete track of the color difference signals, and the respective tracks on which the luminance signals Y1 to Y4 and the luminance signals Y5 to Y8 are recorded (because not selected as the set-up tracks) are disabled from being erased in the track pattern, as shown in FIG. 4.

In order to erase the luminance signals in this case, the inhibition of erasure is released in the operation section 8. Or else, a set of tracks on which the luminance signals are recorded is selected as the set-up track group to erase the luminance signals of any given picture.

Further, in this embodiment, it is possible to set two or more track groups and to discriminate whether or not the image signals recorded on the tracks are erased for each set-up track group.

For instance, it is also possible to select a set of tracks on which the color difference signals are recorded and a set of tracks on which the luminance signals are recorded, simultaneously. Further, it is also possible to select a set of tracks on which the color difference signals belonging to one field and a set of tracks on which the luminance signals belonging to one field, simultaneously. In these cases, when only the luminance signals are erased and only the color difference signals are not erased in the image signals belonging to one picture or one field, the remaining color difference signals can be erased by releasing the erasure inhibition in the operation section 8.

Further, when two or more set-up track groups are selected, it is preferable to select the set-up track groups so that there are no tracks belonging to a plurality of set-up track groups. However, even if there is a selected track belonging to a plurality of the set-up track groups, no problem arises when any one of the effective track and the non-effective track is first discriminated, in step 103 of the flowchart shown in FIG. 8.

As described above, according to the present invention, since the effective track and the non-effective track are discriminated for each track on the basis of the ID data and further one-track erasure is disabled for the effective track, it is possible to execute the erasing operation, without erasing the image signals recorded on the tracks which are not required to be erased. On the other hand, according to the present invention, the image signals recorded on the non-effective track in the predetermined track group can be erased immediately. This means that there is less possibility that useless or unnecessary tracks on which image signals which can not provide a normal picture are recorded remain in the magnetic disk, thus resulting in increasing the utilization efficiency of the magnetic disk.

In the present embodiment, the bit allocation of the ID codes are shown in FIG. 7. Without being limited thereto, however, any bit allocation can be adopted, as far as sufficient information can be recorded for discrimination of recording track modes and the effective and non-effective tracks.

Further, in the present embodiment, six patterns of the set-up track groups have been explained such as a set of all the tracks on which the image signals for one picture are recorded; a set of all the tracks on which the image signals belonging to one field are recorded; a set of the tracks on which the color difference signals are recorded; a set of the tracks on which the luminance signals are recorded; a set of the tracks on which the color difference signals belonging to one field are recorded; and a set of the tracks on which the luminance signals belonging to one field are recorded, in such a way as to be selected freely. Without being limited thereto, however, it is possible to determine other patterns of the set-up track group in addition to the above-mentioned patterns, for instance such as a set of the tracks on which the image signals belonging to the first field are recorded; a set of the tracks on which the image signals belonging to the second field are recorded; a set of the tracks on which the color difference signals belonging to the first field are recorded; a set of the tracks on which the color difference signals belonging to the second field are recorded; a set of the tracks on which the luminance signals belonging to the first field are recorded; a set of the tracks on which the luminance signals belonging to the second field are recorded; a set of the tracks on which the image signals corresponding to an upper half of the picture shown in FIG. 3 are recorded; and a set of the tracks on which the image signals corresponding to a lower half of the picture shown in FIG. 3 are recorded, etc.

Further, it is possible to determine the set-up track groups previously so as to correspond to some of the above-mentioned patterns.

Further, in this embodiment, an alarm is generated after one-track erasure has been disabled (in steps 108 and 109), as shown by the flowchart in FIG. 8. However, the alarm generating step 109 can be omitted, if desired.

Further, in this embodiment, the set-up track group is selected before the pre-search is executed in step 101, in the flowchart shown in FIG. 8. Without being limited thereto, however, this step of selecting the set-up track group can executed in any step, before the step 103 for discriminating whether the track is effective or non-effective.

Further, in the present embodiment, in the image signals corresponding to one picture, the ratios in the number of tracks of the luminance signal (Y), the color difference signal (Pr) and the color difference signal (Pb) are determined as 4:2:2. Without being limited thereto, other ratios can be determined, such as 4:1:1 or 2:2:2, etc.

Further, in this embodiment, although only one magnetic head 1 is used to record and reproduce the image signals, it is also possible to provide a plurality of magnetic heads for the recording system and the reproducing system, respectively. In this case, the magnetic heads for the luminance signal (Y), the color difference signal (Pr) and the color difference signal (Pb) can be arranged separately. Alternatively, 8 magnetic heads (in this embodiment) arranged in parallel to each other so as to correspond to the image signals for one field can be arranged.

Further, in this embodiment, the frame recording operation has been explained by way of example. However, the present invention can be applied to the apparatus for the field recording operation.

Further, in the present embodiment, although the color difference signal (Pr) and the color difference signal (Pb) are recorded in the different tracks, these signals can be recorded on the same one or two tracks. In this case, it is possible to adopt the method of recording the color difference signals (Pr) and (Pb) in linear sequence or after having been divided into a plurality of divisions (e.g., first half and second half) within the same horizontal synchronization period.

Further, in this embodiment, although the image signals for one picture are recorded, reproduced and erased in sequence beginning from the outer circumferential track of the magnetic disk, the sequence thereof is not limited only thereto.

Further, in this embodiment, the image signals are recorded from the outer circumferential side to the inner circumferential side of the magnetic disk 3 in the order of the luminance signals Y1, Y2, Y3 and Y4, the color difference signals Pr1 and Pr2 and the color difference signals Pb1 and Pb2 of the first field, and the luminance signals Y5, Y6, Y7 and Y8, the color difference signals Pr3 and Pr4 and the color difference signals Pb3 and Pb4 of the second field, continuously tack by tack. However, the track pattern on the magnetic disk 3 is not limited only thereto.

In the present invention, the recording medium of the image signals is not limited only to the magnetic recording medium; that is, any recording media such as optical and magneto-optical recording media can be adopted.

The still video apparatus according to the present invention is provided with one or both of the recording system and the reproducing system as described above.

The still video apparatus according to the present invention has been described on the basis of the embodiment with reference to the attached drawings. Without being limited thereto, any circuit configuration can be applied to the recording and reproducing systems, as far as the similar functions can be attained.

Figure 2:
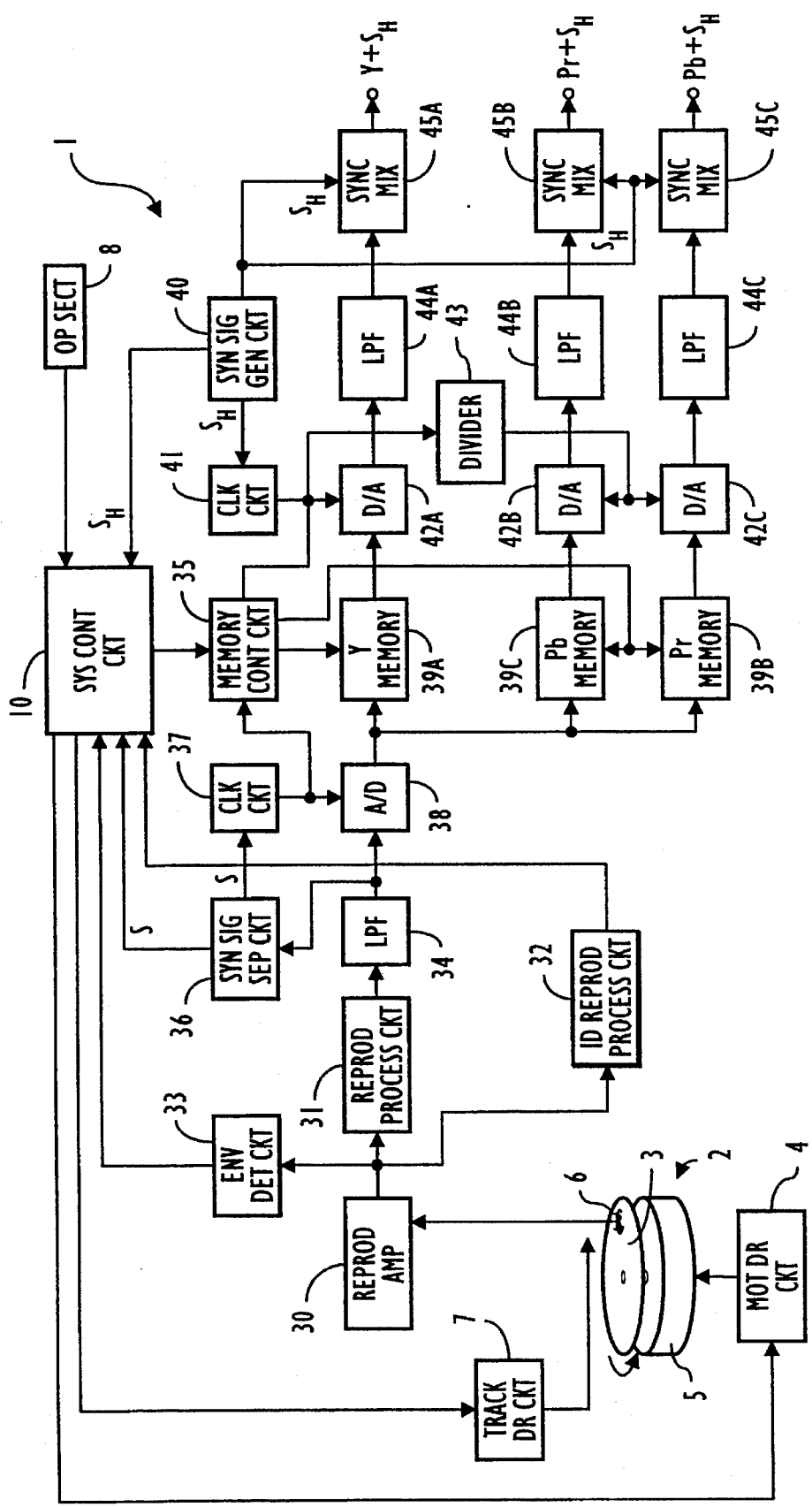
FIG. 2 is a block diagram showing an exemplary configuration of a reproducing system of the still video apparatus according to the present invention.

FIG. 2 is a block diagram showing an exemplary system configuration of a reproducing system of the still video apparatus according to the present invention. In the still video apparatus 1 shown In FIG. 2, a magnetic disk 3, a motor drive circuit 4, a spindle motor 5, a magnetic head 6, a tracking drive circuit 7, a magnetic disk drive mechanism 2, an operation section 8, a display unit (not shown) and a system control circuit 10 are all the same as or can be used in common with those of the recording system shown in FIG. 1.

The image signals and the DPSK (Differential Phase Shift Keying) signals can be read from the respective tracks, by moving the magnetic head 6 relative to the magnetic disk 3 so as to be located in sequence onto the predetermined tracks on which the image signals corresponding to one still picture (i.e., 16 tracks shown in FIG. 4) are recorded.

In this embodiment, with respect to the image signals recorded on 16 tracks corresponding to one still picture, the luminance signals Y1 to Y4 recorded on the outer circumferential tracks on the magnetic disk 3 are first read and then written in a Y memory 39a; the color difference signals Pr1 and Pr2 recorded on the tracks adjacent to the inner circumferential side of the above tracks are read and then written in a Pr memory 39B; and the color difference signals Pb1 and Pb2 recorded on the tracks adjacent to the inner circumferential side of the above tracks are read and then written in a Pr memory 39C, in order to reproduce the image signals belonging to the first field. Further, in the same way as above, the luminance signals Y5 to Y8 and the color difference signals Pr3, Pr4, Pb3 and Pb4 are reproduced.

The image signals read by the magnetic head 6 are amplified by a reproducing amplifier 30, and the luminance signal (Y+S), the color difference signal (Pr+S) and the color difference signal (Pb+S) are inputted to a reproduction processing circuit 31 after having passed through a high-pass filter (not shown), and then FM demodulated. Further the read DPSK signals are inputted to an ID reproduction processing circuit 32 after having passed through a band-pass filter (not shown), and then DPSK demodulated for reproduction of the ID data. The reproduced ID data are inputted to the system control circuit 10.

Further, an envelop detecting circuit 33 is connected to the output side of the reproducing amplifier 30. The envelop detecting circuit 33 detects the envelop of the reproduced signals read by the magnetic head 6, and outputs the envelop detection signals corresponding thereto to the system control circuit 10. The system control circuit 10 controls the tracking drive circuit 7 so that the output of the envelop detection signals can be maximized for implementing the auto-tracking to the magnetic head 6.

As describe above, it is possible to reproduce a clear still picture by implementing the auto-tracking of the magnetic head 6 and the rotation phase control of the spindle motor 5 (described later).

The luminance signal (Y+S), the color difference signal (Pr+S) and the color difference signal (Pb+S) demodulated by the reproduction processing circuit 31 are passed through a low-pass filter 34 to cut off the high frequency band. A synchronizing signal separating circuit 36 separates or extracts the horizontal and vertical synchronizing signals (S) from the respective demodulated signals, and outputs these signals (S) to the system control circuit 10 and a clock generating circuit 37, respectively. The horizontal and vertical synchronizing signals (S) inputted to the system control circuit 10 are used for instance, to read ID data. Further, the clock generating circuit 37 generates a memory write clock signal as a reference signal for writing data in the memory. Thus generated memory write clock signal is inputted to an A/D converter 38 and a memory control circuit 35, respectively.

The FM-demodulated luminance signal (Y) from which the horizontal and vertical synchronizing signals (S) are separated and converted into digital signals by an A/D converter 38, and stored at predetermined addresses of a Y memory 39A.

The FM-demodulated color difference signal (Pr) from which the horizontal and vertical synchronizing signals (S) are separated are converted into digital signals by the A/D converter 38, and stored at predetermined addresses of a Pr memory 39B. In the same way, the color difference signals (Pb) are converted into digital signals by the A/D converter 38, and stored in a Pb memory 39C.

The system control circuit 10 discriminates whether the image signals read by the magnetic head 6 are the luminance signals Y1 to Y8 or the color difference signals Pr1 to Pr4 or the color difference signals Pb1 to Pb4 on the basis of the reproduced ID data, so that the operation of the memory control circuit 45 can be controlled on the basis of the discriminated image signals.

The memory control circuit 35 executes the following control on the basis of the memory write clock signal formed by the clock generating circuit 37, while keeping a predetermined write timing to the respective memory 39A to 39C:

The memory control circuit 35 activates the A/D converter 38 on the basis of the write memory clock signal from the clock generating circuit 37, and further activates a write address counter incorporated therein to write digital data of the luminance signal (Y) at predetermined addresses of the Y memory 16A.

Further, the memory control circuit 35 activates a write address counter incorporated therein on the basis of the memory write clock signal from the clock generating circuit 37 to write digital data of the color difference signals (Pr) and the color difference signals (Pb) at predetermined addresses of a Pr memory 39B and a Pb memory 39C, respectively.

Further, the synchronizing signals (S) included in the reproducing signals such as the luminance signal are not sampled, so that these signals (S) are not written in the memory.

A synchronizing signal generating circuit 40 outputs the horizontal and vertical synchronizing signals (SH) corresponding to the high definition image signals. These outputted signals are inputted to a clock generating circuit 41. The clock generating circuit 41 generates a memory read clock signal as a read reference signal to the respective memories. The generated memory read clock signal is inputted to the memory control circuit 35 and a D/A converter 42A, respectively. Further, the memory read clock signal is divided into ½, and then inputted to two D/A converters 42B and 42C, respectively.

The memory control circuit 35 executes the following control on the basis of the memory read clock signal generated by the clock generating circuit 41, while keeping the predetermined read timing from the respective memories 39A to 39C.

The memory control circuit 35 activates a read address counter incorporated therein on the basis of the memory read clock signal from the clock generating circuit 41, to read digital data of the luminance signal (Y) from predetermined addresses of the Y memory 39A. Further, the memory control circuit 35 activates a D/A converter 42A to convert the read digital luminance signal (Y) into analog signal.

Further, the memory control circuit 35 activates a read address counter incorporated therein on the basis of the memory read clock signal from the clock generating circuit 41 to read digital data of the color difference signal (Pr) and the color difference signal (Pb) from predetermined addresses of the Pr memory 39B and the Pb memory 39C, respectively. Further, the memory control circuit 35 activates D/A converters 42B and 42C, to convert the digital signals of the read color difference signals into tile analog signals, respectively.

Further, the memory control circuit 35 controls the mode switching between the memory write control and the memory read control in accordance with a mode switching command signal applied by the system control circuit 10.

Further, the horizontal and vertical synchronizing signals (S) from the synchronizing signal separating circuit 36 and the horizontal and vertical synchronizing signals (SH) from the synchronizing signal generating circuit 40 are also inputted to the system control circuit 10, respectively. These synchronizing signals are used to control the rotational phase of the spindle motor 5 and as timing signals for various operation.

In the case of the reproduction of high definition picture, the frequency of the memory read clock signal outputted by the clock generating circuit 41 is higher, for instance, 4 times higher than that of the memory write clock signal outputted by the clock generating circuit 37. Therefore, the frequency of the read clock signal for the luminance signal is 4 times higher than that of the write clock signal thereof, and the frequency of the clock signal for both the color difference signals is twice higher than that of the write clock signal thereof. Consequently, the image signals are reproduced in the original state (the state where inputted to the recording system) under compression along the time axis, as compared with the signals read by the magnetic head 6.

The analog luminance signal (Y), color difference signal (Pr) and color difference signal (Pb) are all passed through low-pass filters 44A, 44B and 44C, respectively to cut off the high frequency band. Further, synchronizing signal mixing circuits 45A, 45B and 45C mix the horizontal and vertical synchronizing signals (SH) applied by the synchronizing signal generating circuit 40 with these luminance signal (Y) and the color difference signals (Pr) and (Pb), respectively.

The luminance signal (Y+SH), the color difference signal (Pr+SH) and the color difference signal (Pb+SH) are all outputted through output circuits (not shown) as video signals to reproduce a still picture on the display unit connected thereto.

Further, it is also possible to provide the image signal erasing mechanism as already explained for the above-mentioned reproducing system.

In the present embodiment, although the bit allocation of the ID codes, as shown in FIG. 7, has been explained. Without being limited thereto, however, it is possible to adopt any allocation, as far as sufficient information for specifying the tracks on which the image signals to be erased can be recorded.

Further, in this embodiment, four patterns, such as for example the all track erasure, the first field erasure, the second field erasure and the color difference signal track erasure have been determined as the erasing patterns and further any one of them can be selected freely as explained above. Without being limited only to the four patterns, it is possible to adopt other patterns, for instance such that: only the luminance signals Y1 and Y2 and the color difference signals Pr1 and Pb1 of the first field and the luminance signals Y5 and Y6 and the color difference signals Pr3 and Pb3 of the second field can be erased in the track pattern as shown in FIG. 4; only the upper half of the picture can be erased in FIG. 3; only the luminance signals Y3 and Y4 and the color difference signals Pr2 and Pb2 of the first field and the luminance signals Y7 and Y8 and the color difference signals Pr4 and Pb4 of the second field can be erased in the track pattern as shown in FIG. 4; and only the lower half of the picture can be erased in FIG. 3.

Further, it is also possible to determine the erasing pattern previously. That is, it is possible to set the erasing pattern to one of the all track erasure, the first field erasure, the second field erasure, the color difference signal track erasure, the first field color difference signal erasure and the second field color difference signal erasure.

Further, when the erasing pattern is determined previously, the ordinary erasing means such that the erasure track is decided by the user manually and the magnetic head is moved onto the decided track for erasure is preferably provided for the apparatus. Or else, any other erasing means can be provided for the apparatus.

Further, in the present embodiment, in the image signals corresponding to one picture, the ratios in the number of tracks of the luminance signal (Y), the color difference signal (Pr) and the color difference signal (Pb) are determined as 4:2:2. Without being limited thereto, other ratios can be determined such as 4:1:1 or 2:2:2, etc.

Further, in this embodiment, although only one magnetic head 1 is used to record and reproduce the image signals, it is also possible to provide a plurality of magnetic heads for the recording system and the reproducing system, respectively. In this case, the magnetic heads for the luminance signal (Y), the color difference signal (Pr) and the color difference signal (Pb) are arranged, separately. Or else, 8 magnetic heads (in this embodiment) arranged in parallel to each other so as to correspond to the image signals for one field can be arranged.

Further, in this embodiment, the frame recording operation has been explained by way of example. However, the present invention can be applied to the apparatus for the field recording operation.

Further, in the present embodiment, although the color difference signal (Pr) and the color difference signal (Pb) are recorded in the different tracks, these signals can be recorded on the same one or two tracks. In this case, it is possible to adopt the method of recording the color difference signals (Pr) and (Pb) in linear sequence or after having divided into a plurality of divisions (e.g., first half and second half) within the same horizontal synchronization period.

Further, in this embodiment, although the image signals for one picture are recorded, reproduced and erased in sequence beginning from the outer circumferential track of the magnetic disk, the sequence thereof is not limited only thereto.

Further, in this embodiment, the image signals are recorded from the outer circumferential side to the inner circumferential side of the magnetic disk 3 in the order of the luminance signals Y1, Y2, Y3 and Y4, the color difference signals Pr1 and Pr2 and the color difference signals Pb1 and Pb2 of the first field, and the luminance signals Y5, Y6, Y7 and Y8, the color difference signals Pr3 and Pr4 and the color difference signals Pb3 and Pb4 of the second field, continuously tack by tack. However, the track pattern on the magnetic disk 3 is not limited only thereto.

Another embodiment of the erasing means according to the present invention will be described hereinbelow.

As shown in FIG. 1, the still video apparatus 1 is provided with an erasure signal generating circuit 28, which is connected to terminal e of the change-over switch 29 for selecting recording or erasure. Therefore, for instance, when an erasure switch of the operation section 8 is depressed, terminal e of the change-over switch 29 is connected under control of the system control circuit 10, so that the erasing signal generating circuit 28 is activated to output an erase signal. The outputted erase signal is amplified by the recording amplifier 27 and applied to the magnetic head 6, so that the image signals recorded on predetermined tracks on the rotating magnetic disk 3 are erased.

In the still video apparatus 1, in a plurality of tracks on which the image signals corresponding to one picture are recorded, a predetermined set-up track group is determined and classified according to the sorts of the image signals, and the image signals recorded on the predetermined set-up track group are all erased.

In this case, the predetermined set-up track group (referred to as set-up track group) implies all or a part (selected by the user) of the tracks on which image signals corresponding to one picture are recorded.

In the present invention, in order to record many pictures on a limited recording space on the magnetic disk 3, it is possible to erase the image signals recorded on a part of all the tracks for constituting one picture. Therefore, any desired picture can be obtained by reproducing the image signals recorded on the remaining tracks.

As the set-up track group patterns (erasing patterns) of the image signals, two following patterns can be given for instance, in addition to the erasing pattern for erasing all the tracks (all the tracks on which the image signals for one picture are recorded):

(1) In the case of the frame recording, an erasing pattern such that only the image signals belonging to any one of the two fields for constituting one frame are erased. This erasing pattern is selected when the space of the magnetic disk is required to be saved, or when the utilization efficiency of the magnetic disk is required to be increased, or when more pictures are require to be recorded in a limited space on the magnetic disk.

(2) In the case where the luminance signals and the color difference signals are recorded on mutually different tacks, an erasing pattern such that only the color difference signals are erased. This erasing pattern is selected when the color image signals once recorded on the magnetic disk are kept recorded as the block-and-white image signals to save the space of the magnetic disk, or when the utilization efficiency of the magnetic disk is required to be increased or when more pictures are require to be recorded in a limited space on the magnetic disk.

Figure 9:
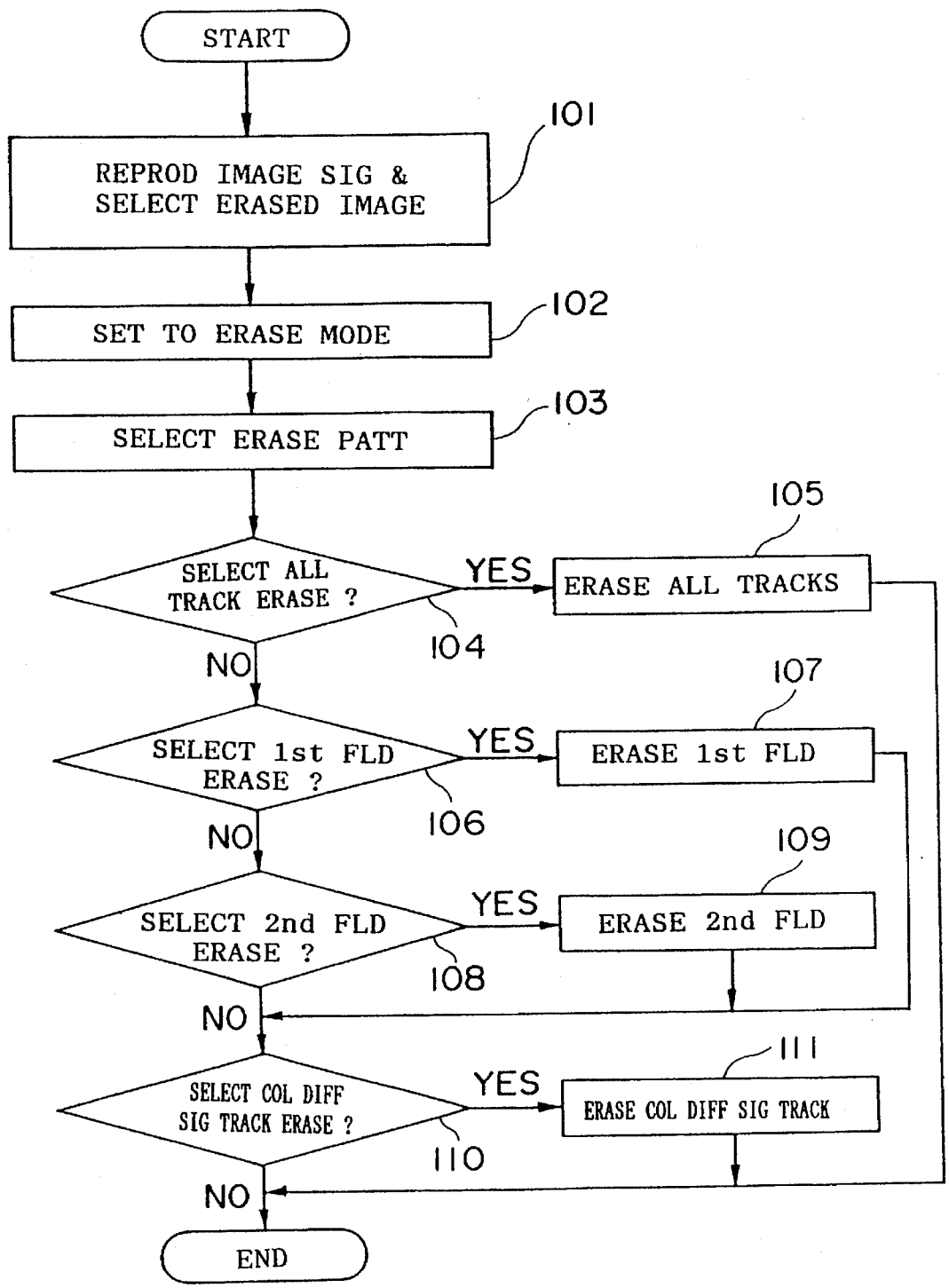
FIG. 9 is a flowchart for an erasure sequence of image signals in a second embodiment of the present invention.

The erasure sequence of the image signals will be described hereinbelow with reference to flowcharts shown in FIGS. 9, 10 and 11.

In the erasing operation of image signals, all the tracks of the magnetic disk 3 are pre-searched to input ID data recorded on the respective tracks to the system control circuit 10.

First, as described later, the image signals are reproduced, and the image signals to be erased are selected by the operation section 8 (in step 101).

Then, an erase switch of the operation section 8 is turned ON to set the mode to the erasure mode (in step; 102).

Successively, a set-up track group is determined. In practice, an erasing pattern is selected by a selection switch of the operation section 8 (in step 103). As the erasing pattern in this embodiment, there are the following erasing patterns: the all track erasure mode which erases all the image signals corresponding to one picture; the first field erasure mode which erases only the image signals belonging to the first field in the frame recording; the second field erasure mode which erases only the image signals belonging to the second field in the frame recording; and the color difference signal track erasure mode which erases only the color difference signals (Pr) and (Pb). One or two of these erasure patterns are selected.

After the erasing pattern has been selected as described above, the system control circuit 10 (referred to as control, hereinafter) discriminates whether the all track erasure mode has been selected (in step 104). If the all track erasure mode is selected, control executes the all track erasure mode on the basis of the ID data as already explained (in step 105). In practice, steps 107 and 109 (described later) are executed continuously.

In step 104, when control discriminates that the all track erasure mode is not selected, control discriminates whether the first field erasure mode is selected or not (in step 106). When the first field erasure mode has been selected, control executes the first field erasure on the basis of the ID data (in step 107).

In step 106, when control discriminates that the first field erasure mode is not selected, control discriminates whether the second field erasure mode is selected (in step 108). When the second field erasure mode has been selected, control executes the second field erasure mode on the basis of the ID data (in step 109).

In step 108, when control discriminates that the second field erasure mode is not selected, after the execution of the first field erasure mode in step 107 and the second filed erasure mode in step 109, control discriminates whether the color difference signal erasure mode is selected (in step 110). When the color difference signal erasure mode has been selected, control executes the color difference signal erasure mode on the basis of the ID data (in step 111).

When control discriminates that the second field erasure mode is not selected in step 108 and further the color difference signal erasure has been selected in step 110, all the color difference signals of the first field and the second field are erased in step 111.

Further, the erasing operation is executed in steps 105, 107, 109 and 111, irrespective of the effectiveness or non-effectiveness of the respective tracks.

In step 111, when control discriminates that the color difference signal track erasure mode is not selected, control ends this program, without executing any erasure operation.

Further, in this embodiment, although all the tracks of the magnetic disk 3 are pre-searched, this pre-search step can be omitted. In this case, since the ID data are inputted to the system control circuit 10 when the image signals are reproduced in step 101, the erasure can be executed on the basis of the inputted ID data.

In the present invention, when one erasing pattern of the image signals corresponding to one picture is selected to execute the erasure, all of the image signals of the selected sorts are erased on the basis of the ID data.

Figure 10:
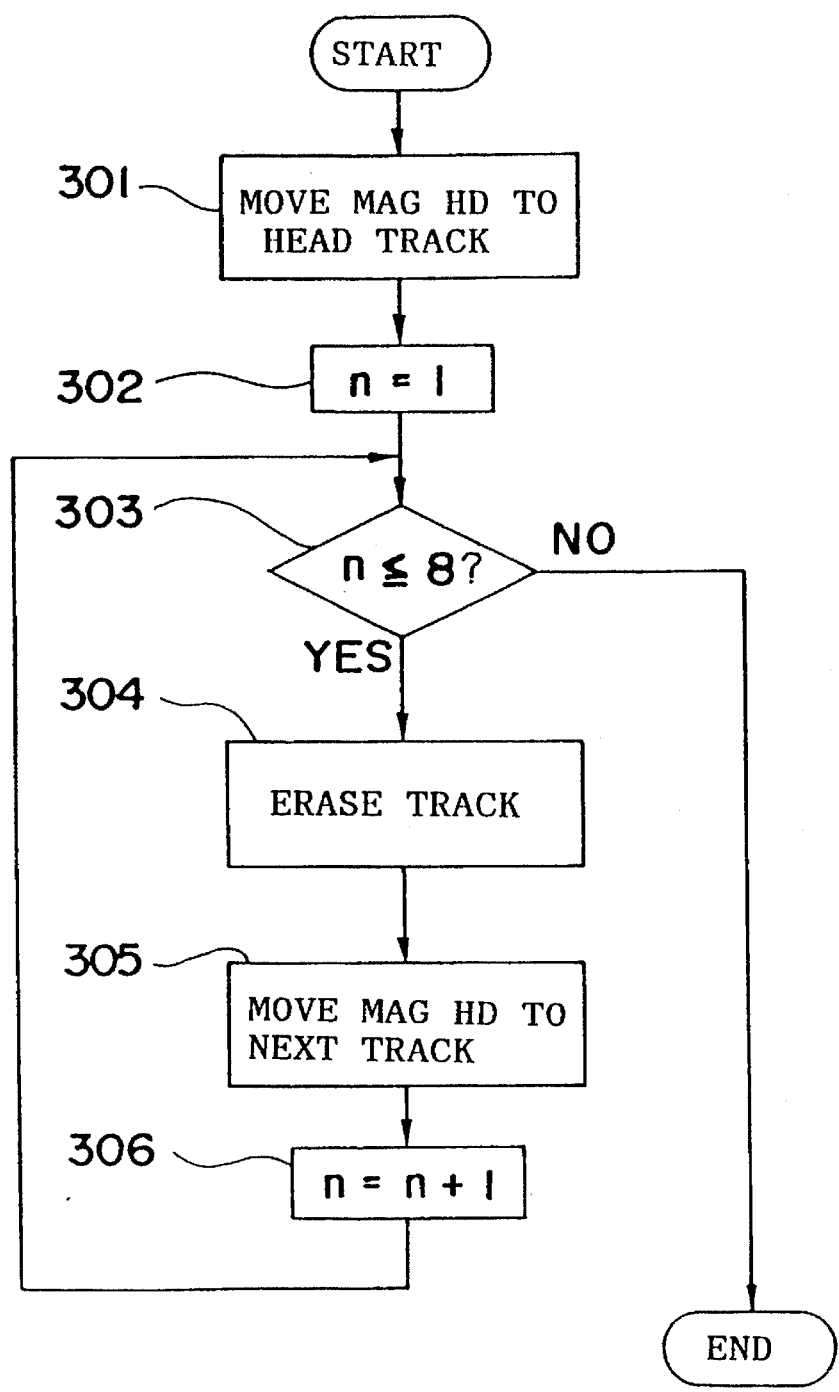
FIG. 10 is a flowchart for the erasure sequence of image signals belonging to a first field in the second embodiment.

FIG. 10 is a flowchart showing the sequence for erasing the first field image signals, which is executed when the first field erasure mode is discriminated to be selected in step 106; that is, when the image signals are recorded in accordance with the track pattern as shown in FIG. 4.

Control detects the head track number of the first field of the image signals to be erased (which corresponds to Y1 in the track pattern shown in FIG. 4) on the basis of the head track number and the information related to the composing picture number, etc. of the ID data recorded in the respective tracks of the magnetic disk 3. Control further moves the magnetic head 6 onto the detected head track (in step 301) and further sets the counter to n=1 (in step 302).

Successively, control discriminates whether n≦8 (in step 303). If n≦8, the image signals recorded on the tracks (on which the magnetic head 6 is now located) are erased (in step 304).

After the step 304, control detects succeeding track number of the first field of the image signals to be erased (which corresponds to Y2 in the track pattern shown in FIG. 4) on the basis of the succeeding track number and the information related to the composing picture number, etc. of the ID data. Control further moves the magnetic head 6 onto the detected succeeding track (in step 305) and further increments the counter n by 1 (in step 306), returning to step 303. In step 303, if n>8, the program ends.

By the execution of the program shown in FIG. 10, it is possible to erase in sequence the luminance signals Y1 to Y4, the color difference signals Pr1, Pr2, Pb1 and Pb2 all recorded on 8 tracks continuously arranged in the radial direction of the magnetic disk 3.

In the case of the second erasure, in the same way as above, it is possible to erase in sequence the luminance signals Y5 to Y8, the color difference signals Pr3, Pr4, Pb3 and Pb4 on the basis of the ID data, in the case of the track pattern shown in FIG. 4.

Figure 11:
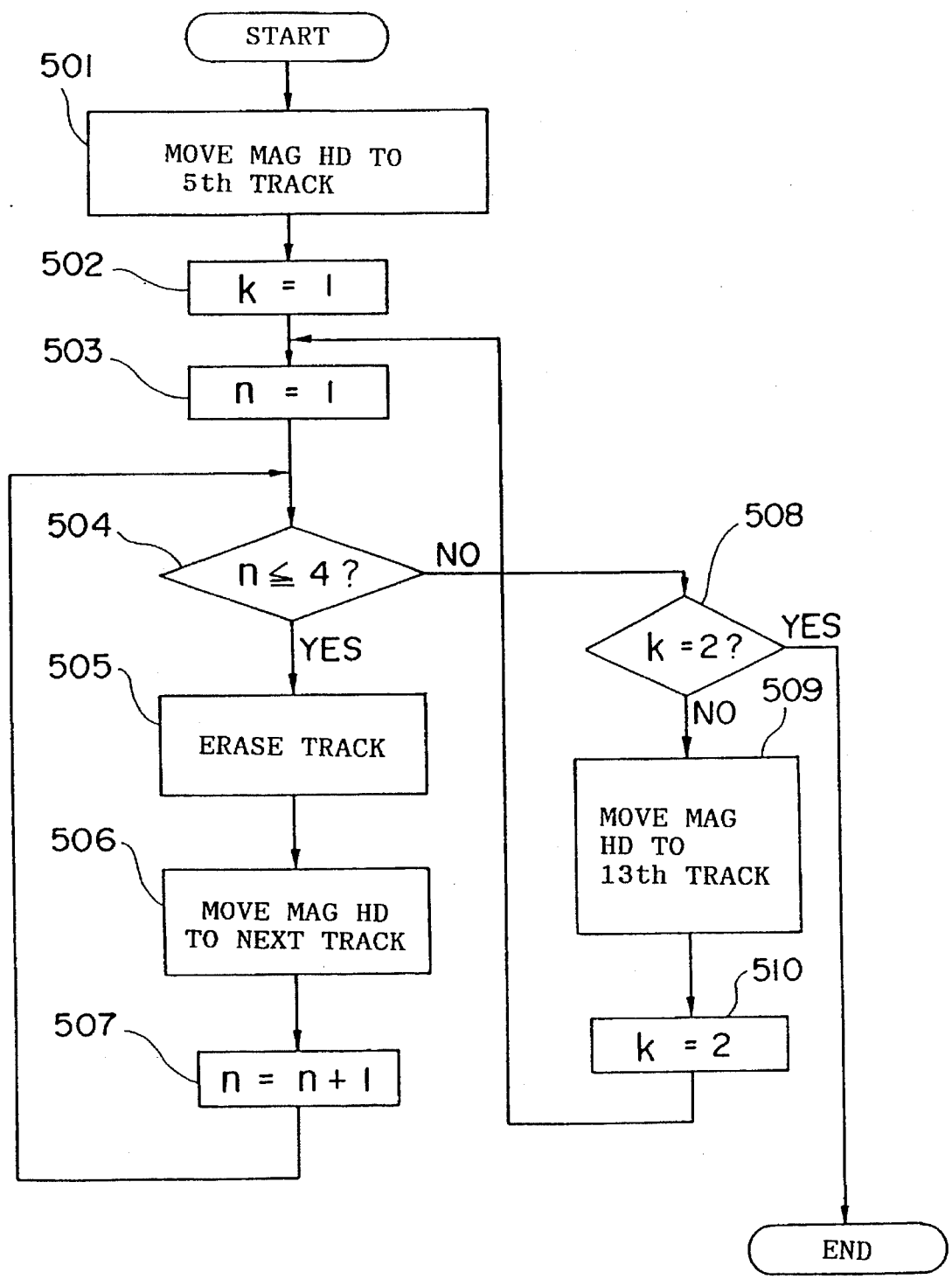
FIG. 11 is a flowchart for the erasure sequence of the color difference signals of the same embodiment.

FIG. 11 is a flowchart showing the sequence for erasing the color difference signals belonging to the first field and the second field, which is executed when the first field erasure mode and the second field erasure are discriminated to be not selected in steps 106 and 108 and when the color difference signal erasure is selected in step 110; that is, the image signals are recorded in accordance with the track pattern as shown in FIG. 4.

Control detects the fifth track on which the color difference signal Pr1 belonging to the first field of the picture to be erased are recorded on the basis of the ID data recorded in the respective tracks of the magnetic disk 3, and moves the magnetic head 6 onto the detected fifth track (in step 501) and further sets a first counter to k=1 (in step 502) and a second counter to n=1 (in step 503).

Successively, control discriminates whether n≦4 (in step 504). If n≦4, the image signals recorded on the tracks (on which the magnetic head 6 is now located) are erased (in step 505).

After the step 505, control detects the succeeding track number (which corresponds to Pr2 in the track pattern shown in FIG. 4) on the basis of the ID data, and moves the magnetic head 6 onto the detected succeeding track (in step 506) and further increments the second counter n by 1 (in step 507), returning to step 504. The above steps 504 to 507 are repeatedly executed. In step 504, if n>4, control discriminates whether k=2 (in step 508).

When k does not equal 2 in step 508; that is, k=1, control detects the thirteen track on which the color difference signal Pr3 belonging to the second field of the picture to be erased are recorded on the basis of the ID data, and moves the magnetic head 6 onto the detected thirteenth track (in step 509) and further increments the first counter k by one to k=2 (in step 510) and sets the second counter n to n=1 (in step 503), returning to step 504.

Successively, control discriminates whether n≦4 (in step 504). If n≦4, control erases the signals recorded on the current track (on which the magnetic head 6 is now located) (in step 505).

After the step 505, control detects the succeeding track on which the image signals to be erased are recorded (which corresponds to Pr4 in the track pattern shown in FIG. 4), on the basis of the ID data, and moves the magnetic head 6 onto the detected succeeding track (in step 506) and further increments only the second counter n by 1 (in step 507), returning to step 504.

The above steps 504 to 507 are executed repeatedly. In step 504, if n>4, control discriminates whether k=2 (in step 508). If k=2 in step 508, the program ends.

By the execution of the program shown in FIG. 11, it is possible to erase in sequence the color difference signals Pr1, Pr2, Pb1, Pb2, Pr3, Pr4, Pb3 and Pb4 all recorded on the magnetic disk 3.

Further, when two erasing patterns are selected, the image signals can be erased in the same way on the basis of the ID data. For instance, when the first field erasure and the color difference signal track erasure mode are selected in the case of the track pattern shown in FIG. 4, the luminance signals Y1 to Y4, the color difference signals Pr1, Pr2, Pb1 and Pb2, and the color difference signals Pr3, Pr4, Pb3 and Pb4 are all erased in sequence. Further, when the second field erasure mode and the color difference signal track erasure mode are selected in the case of the track pattern shown in FIG. 4, the luminance signals Y5 to Y8, the color difference signals Pr3, Pr4, Pb3 and Pb4, and the color difference signals Pr1, Pr2, Pb1 and Pb2 are all erased in sequence.

As described above, according to the present invention, since the ID data are utilized, it is possible to erase only the image signals of the selected sort simultaneously, so that it is possible to improve the erasing efficiency. In addition, since all the image signals of the selected sort can be erased, it is possible to keep the image signals according to the objects in a small limited space, without leaving wasteful tracks from which a normal or complete picture will not be reproduced (caused by the conventional erasing operation), so that it is possible to improve the usability of the recording space on the magnetic disk.

Further, in the present invention, the function of erasing the image signals includes such a function that image signals on predetermined tracks are erased simply and such a function that the image signals are erased and further new image signals are recorded simultaneously (i.e., overwrite).

Further, the erasure method of the present invention an be applied to the still video apparatus alone or in combination with the embodiment of the erasing means. In the case of the combination, it is possible to erase the image signals of the track groups simultaneously, when the image signals for constituting the picture are required to be erased, after the track group including the tracks required to be erased has been determined to be the normal track group or the abnormal track group, respectively.

Further, in the present invention, the recording medium for image signals is not limited to only the magnetic recording medium; that is, any recording media such as optical and magneto-optical recording media can be adopted.

The still video apparatus according to the present invention is provided with one or both of the recording system and the reproducing system as described above.

The still video apparatus according to the present invention has been described on the basis of the preferred embodiment with reference to the attached drawings. Without being limited thereto, however, any circuit configuration can be applied to the recording and reproducing systems, as far as the similar functions can be attained.

Finally, it should be noted that the present disclosure relates to subject matter contained in Japanese Patent Applications Nos. HEI 4-350908 and HEI 4-350909 both filed on Dec. 3, 1992 which are expressly incorporated herein by reference in its entirety.

What is claimed is:

1. A still video apparatus, comprising:

means for recording image signals corresponding to one picture composed of at least one field on a plurality of tracks formed on a recording medium and successively arranged thereon, said image signals being recorded with serial identification data associated with said image signals;

means for selecting at least one track group that includes tracks from said plurality of tracks, based upon said serial identification data;

means for determining whether said tracks of said at least one track group selected by said selecting means includes an incomplete track, based upon said serial identification data;

means for designating a track having an image signal to be erased from said plurality of tracks;

means for erasing said image signal recorded on said track designated by said designating means by a one track erasure; and controlling means for enabling said one track erasure of said designated track by said erasing means, when said determining means determines that said tracks of said selected at least one track group includes an incomplete track, and for disallowing said one track erasure of said designated track in said selected at least one track group by said erasing means, when said determining means determines that all tracks of said track group do not include any incomplete track therein.

2. The still video apparatus of claim 1, wherein said image signals recorded on said plurality of tracks comprise luminance signals and color difference signals.

3. The still video apparatus of claim 2, wherein said recording means divides said image signals into said luminance signals and said color difference signals, said luminance signals and said color difference signals being recorded on said recording medium in a predetermined order on different tracks of said plurality of tracks, said serial identification data including information related to said predetermined order.

4. The still video apparatus of claim 3, wherein said luminance signals are recorded on said recording medium prior to a recording of said color difference signals, said serial identification data comprising first data identifying a head track number, second data identifying a succeeding track number and third data formed from serial data assigned to each track of said plurality of tracks, a determination by said determining means being based upon said first, second and third data.

5. The still video apparatus of claim 1, wherein said selected track group comprises a set of tracks on which said image signals belonging to one field are recorded.

6. The still video apparatus of claim 1, wherein said selected track group comprises a set of tracks on which said color difference signals are recorded.

7. The still video apparatus of claim 1, wherein said selecting means selects at least two track groups, said determining means determining whether image signals recorded on tracks of each of said at least two track groups can be erased in each track group.

8. The still video apparatus of claim 1, further comprising means for erasing all image signals recorded on respective tracks of said selected track group in one erasing operation.

9. A still video apparatus, comprising:

means for recording image signals corresponding to one picture composed of at least one field on a plurality of tracks formed on a recording medium, said image signals being recorded with serial identification data associated with said image signals, said image signals being divided into luminance signals and color difference signals, in which each of said luminance signals and said color difference signals in each field are recorded on different tracks of said plurality of tracks in accordance with a predetermined order determined by said serial identification data;

means for manually selecting at least one erasing mode from a plurality of erasing modes, said plurality of erasing modes comprising a first erasing mode that only effects an erasure of image signals belonging to one of a first field or a second field of a frame recording mode, and a second erasing mode that only effects an erasure of said color difference signals recorded on said tracks of said plurality of tracks;

means for determining at least one track group that includes said tracks on which said image signals to be erased are recorded, based upon said serial identification data, in accordance with said erasing mode selected by said selecting means, said determining means determining tracks on which said color difference signals are recorded based upon said serial identification data; and means for erasing all image signals recorded on said tracks of said at least one track group, as determined by said determining means, in a single erasing operation.

10. The still video apparatus of claim 9, wherein said luminance signals are recorded to said recording medium prior to a recording of said color difference signals, said serial identification data comprising first data identifying a head track number, second data identifying a succeeding track number and third data formed from serial data assigned to each track of said plurality of tracks, a determination by said determining means being based upon said first, second and third data.

* * * * *